May 6, 1958 H. K. ROBIN 2,833,857
FREQUENCY SHIFT SIGNALLING SYSTEM
Filed Feb. 6, 1956 12 Sheets-Sheet 1

INVENTOR
Harold K. Robin
BY
Ralph B. Stewart
ATTORNEY

INVENTOR
Harold K. Robin
BY
Ralph B. Stewart
ATTORNEY

May 6, 1958 H. K. ROBIN 2,833,857

FREQUENCY SHIFT SIGNALLING SYSTEM

Filed Feb. 6, 1956 12 Sheets-Sheet 3

INVENTOR
Harold K. Robin
BY Ralph B. Stewart
ATTORNEY

May 6, 1958 H. K. ROBIN 2,833,857

FREQUENCY SHIFT SIGNALLING SYSTEM

Filed Feb. 6, 1956 12 Sheets-Sheet 4

INVENTOR
Harold K. Robin
BY
Ralph B. Stewart
ATTORNEY

INVENTOR
Harold K. Robin
BY
Ralph B. Stewart
ATTORNEY

May 6, 1958 H. K. ROBIN 2,833,857

FREQUENCY SHIFT SIGNALLING SYSTEM

Filed Feb. 6, 1956 12 Sheets-Sheet 6

INVENTOR
Harold K. Robin
BY
Ralph B. Stewart
ATTORNEY

INVENTOR
Harold K. Robin
BY
Ralph B. Stewart
ATTORNEY

May 6, 1958 H. K. ROBIN 2,833,857

FREQUENCY SHIFT SIGNALLING SYSTEM

Filed Feb. 6, 1956 12 Sheets-Sheet 8

INVENTOR
Harold K. Robin
BY
Ralph B. Stewart
ATTORNEY

May 6, 1958

H. K. ROBIN 2,833,857

FREQUENCY SHIFT SIGNALLING SYSTEM

Filed Feb. 6, 1956

12 Sheets-Sheet 9

INVENTOR
Harold K. Robin
BY
Ralph B. Stewart
ATTORNEY

INVENTOR
Harold K. Robin
BY
Ralph B. Stewart
ATTORNEY

INVENTOR
Harold K. Robin
BY Ralph B. Stewart
ATTORNEY

INVENTOR
Harold K. Robin
BY
Ralph B. Stewart
ATTORNEY

United States Patent Office 2,833,857

Patented May 6, 1958

2,833,857

FREQUENCY SHIFT SIGNALLING SYSTEM

Harold Kilner Robin, Tunbridge Wells, England, assignor to National Research Development Corporation, London, England Application February 6, 1956, Serial No. 563,765

Claims priority, application Great Britain December 6, 1950

7 Claims. (Cl. 178—66)

Figure 1:
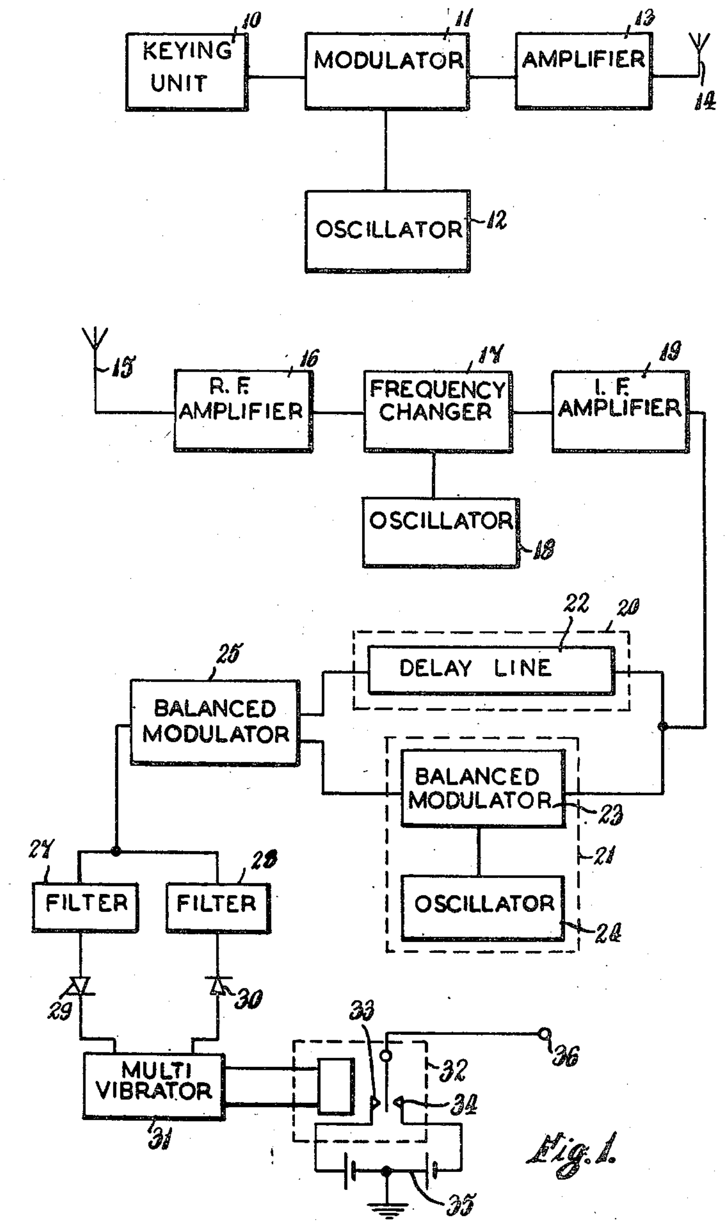

The invention of this application, which is a continuation-in-part of application Serial No. 259,637, filed December 3, 1951, now abandoned, relates to electric signalling.

Intelligence is often transmitted by means of a succession of bursts of oscillations which may be of equal or unequal durations. For example in telegraphy employing carrier frequency shift keying mark and space signals are applied to transmit bursts of oscillations of two different frequencies respectively. The difference between the frequencies of the oscillations representing the mark and space signals may, for example, be a few hundred cycles per second. The mark and space signals transmitted in such systems are given durations dependent upon the intelligence to be transmitted, but it us usual to arrange that each transmitted burst has a duration which is an integral multiple of a selected time interval.

Other systems have been proposed in which a succession of items of intelligence are transmitted by transmitting as a modulation of a carrier oscillation a succession of regularly recurring bursts of oscillations, the several bursts of oscillations being of equal durations and the frequencies of the bursts representative of different items of intelligence having different frequencies.

In a receiver in such systems it is necessary to provide, for demodulation purposes, a local oscillator of known frequency. For example in the case of carrier frequency-shift keying the radio frequency oscillations representing mark and space signals have to be converted into positive and negative-going impulses for application to a telegraph relay. These impulses are obtained in known receivers by beating a locally-generated oscillation with the received oscillations to produce beats of two different frequencies alternately representing the mark and space signals. These beats may, for example, have frequencies of 600 and 1600 c./s. These are separated by means of suitable low frequency filters and the outputs of the filters are rectified and applied to provide the negative and positive-going impulses previously referred to.

It is well known that drift in the frequency of the locally-generated oscillations leads to either distortion or unintelligibility in the demodulated signals. For example in the case of the example previously referred to employing carrier frequency shift keying, the two output oscillations may differ in frequency by only 800 c./s. If the radio frequency oscillations from which the output oscillations are derived are of the order of, say, 20 mc./s. the locally-generated oscillations are of the same order. The frequency of the local oscillator must therefore be maintained stable within a small number of cycles in 20 million in order to provide satisfactory results.

Elaborate and costly apparatus has been proposed to ensure frequency stability of the local oscillator to the degree necessary to ensure satisfactory results. The usual practice is to transmit along with the bursts of oscillation a pilot carrier which is of low amplitude compared with that of the bursts. The pilot carrier may then be amplified and used in the receiver to synchronise a local oscillator. As the amplitude of the pilot carrier is low, however, it often happens that due to fading the amplitude of the pilot carrier falls to such a low value that control over the frequency of the local oscillator in the receiver is lost. Drift in the frequency of the local oscillator then occurs resulting in distortion or even unintelligibility.

One object of the present invention is to provide an improved electric signalling system for transmitting intelligence in the form of bursts of oscillations in which the need for a pilot carrier is removed.

According to the present invention, an electric signalling system comprises a transmitter adapted to transmit as a modulation of a carrier oscillation a succession of bursts of oscillations, different bursts commencing at different ones of a succession of regularly recurring instants spaced apart by a time period $t$, and a receiver adapted to receive the transmitted oscillations and in which, in operation, the received oscillations are applied through two transmission channels or networks to an output circuit adapted to provide an output whose frequency at any instant is equal to the difference between the frequencies of the outputs of the two networks at that instant, one of the channels or networks including means for changing the frequency of oscillations applied thereto by a predetermined amount and at least one of the networks including a delay device, the arrangement being such that the output from a first of the networks is delayed relatively to the output from the second by the time $t$, and the durations of the bursts being such that each burst appearing at the output of the first network coincides at least partly with the next succeeding received burst appearing at the output of the second network. If the system is for transmitting mark and space signals the bursts of oscillations are of two different frequencies alternately and their frequency difference is constant. By including the frequency changer device in one of the networks, however, the bursts of oscillation appearing at the output of the output circuit are of two different frequencies alternately representative of the mark and space signals. The frequency changer device may be arranged to either add or subtract a fixed amount from the oscillations applied thereto. The frequency changer may for example comprise a balanced modulator and the fixed amount added or subtracted may be of low frequency. Thus a low frequency oscillator may be used in effecting the frequency change and as is well known a low frequency oscillator can readily be made stable. A superheterodyne receiver may, and usually will be employed, but drift in the frequency of the local oscillator used in the frequency changer portion of the superheterodyne receiver affects all received signals equally and hence has no effect on the frequency of the oscillations appearing in the output of the receiver.

According to a feature of the invention the differences between the frequencies of successively transmitted pairs of bursts are representative of a succession of items of intelligence, whereby the frequencies of the bursts at the output of the receiver are directly representative of the succession of items of intelligence respectively.

Figure 2:
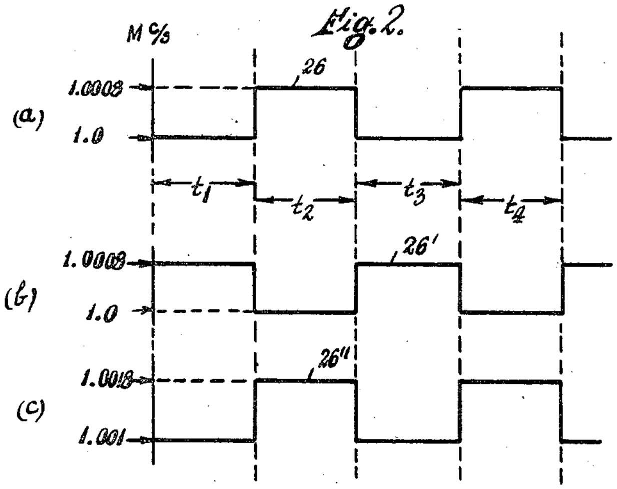
Figure 3:
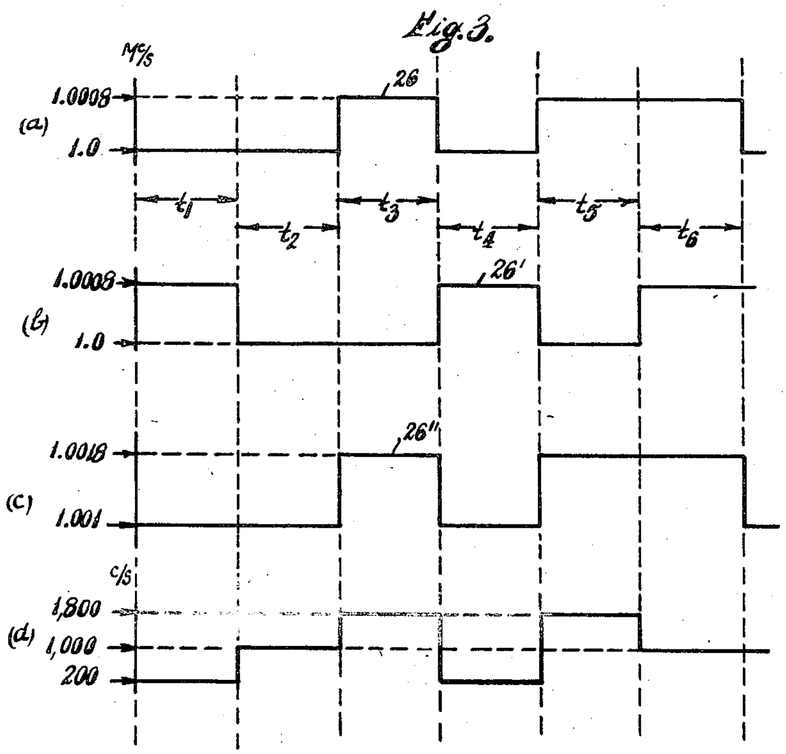
Figure 3A:
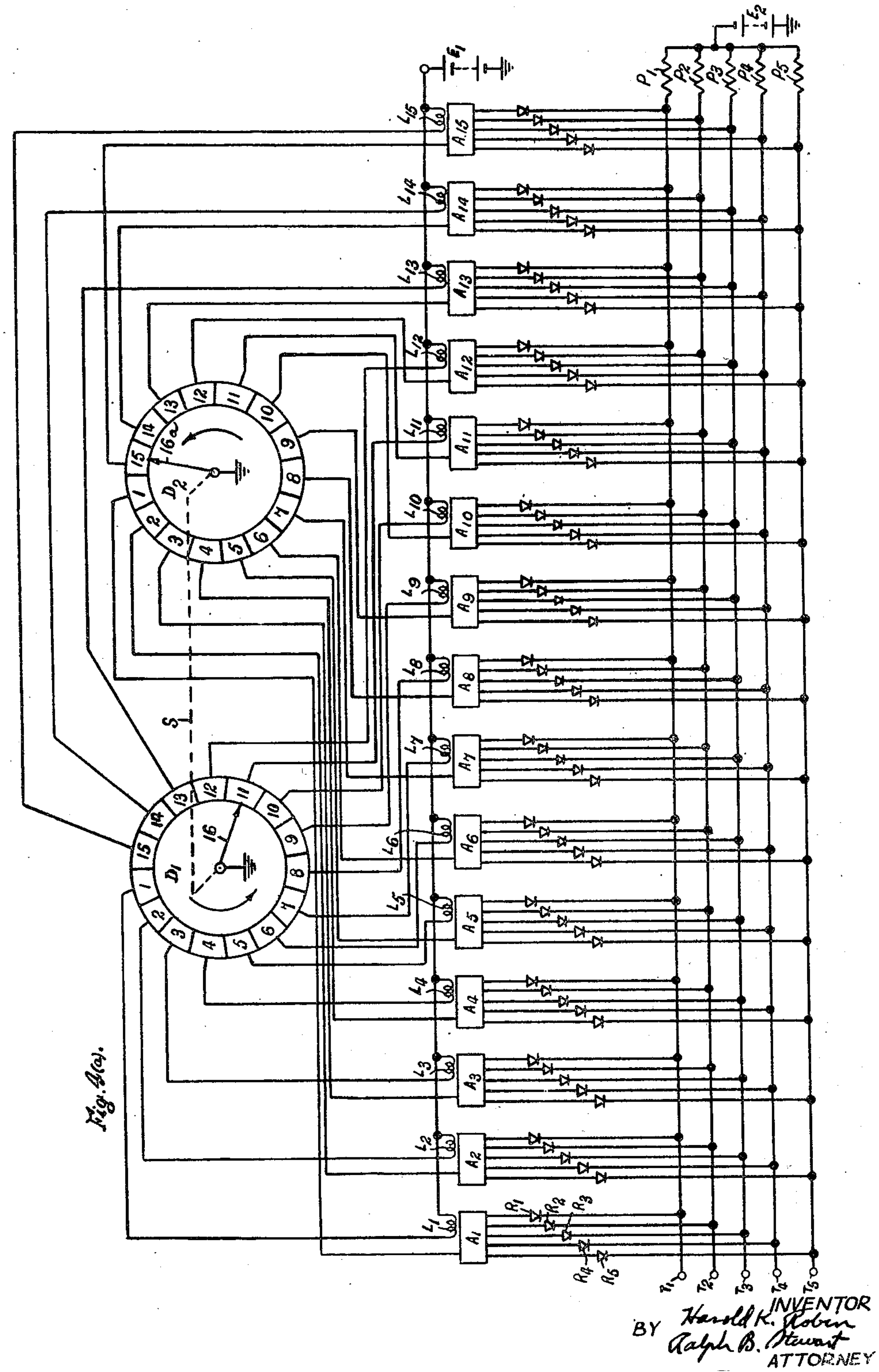
Figure 4C:
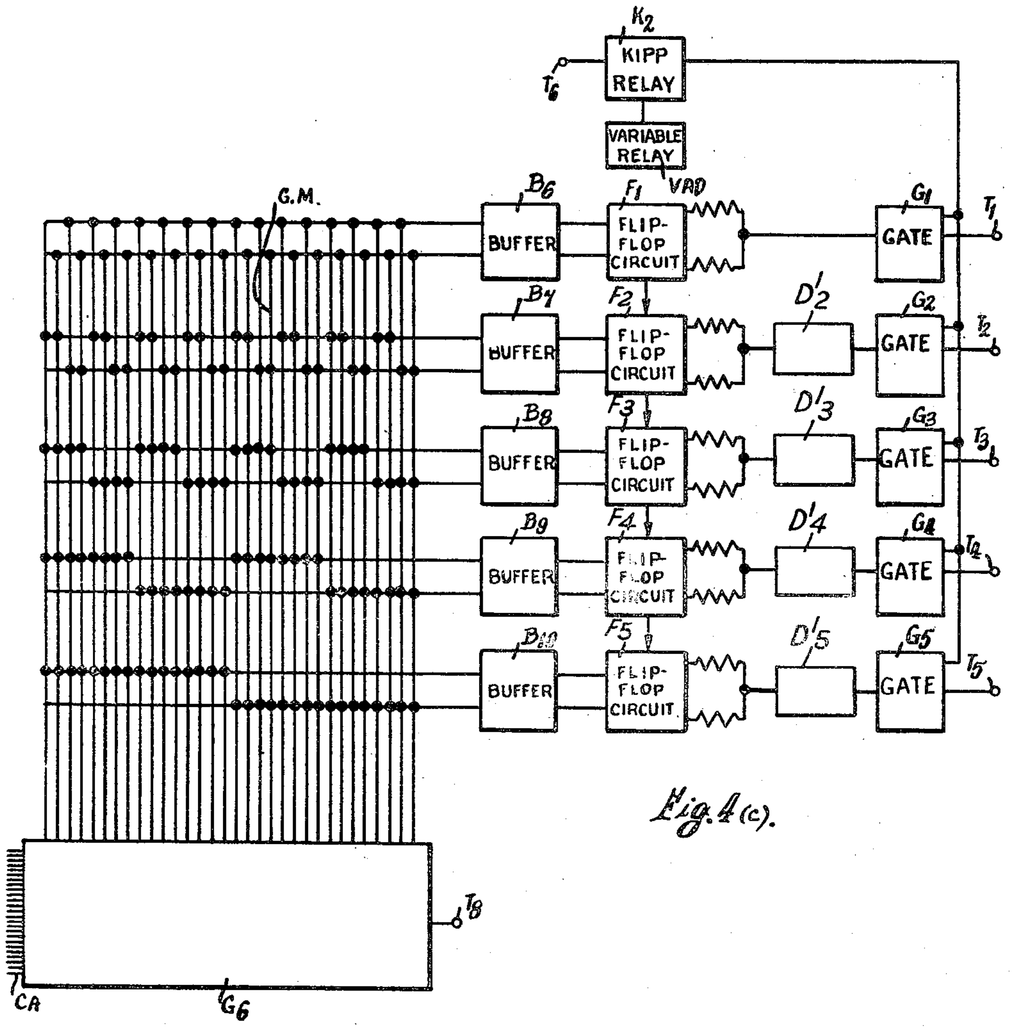
Figure 4B:
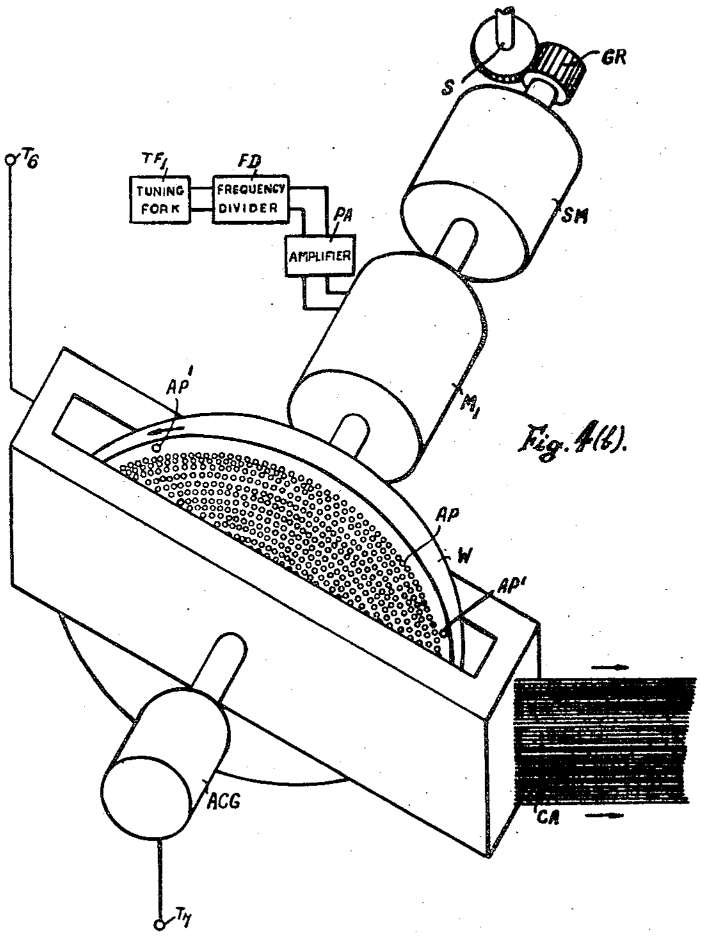
Figure 4D:
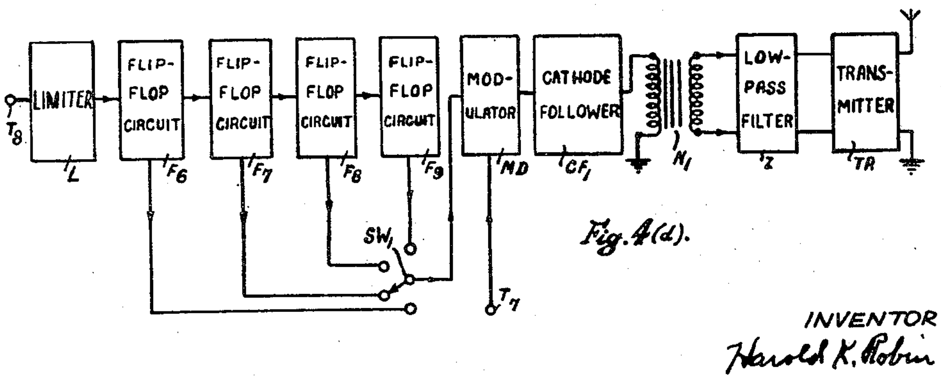

The invention will now be described, by way of example, with reference to the accompanying drawings in which, Figure 1 is a block schematic diagram of a carrier frequency shift telegraph system;

Figures 2 and 3 are explanatory diagrams,

Figure 4 is a schematic diagram of apparatus at a transmitting terminal of a 15 channel teleprinter system. It is convenient to divide Figure 4 into four parts, Figures 4($a$) to 4($d$), of which Figure 4($a$) shows an arrangement of 15 synchronised automatic senders for generating teleprinter signals in turn, Figure 4($b$) is a diagrammatic sketch of a generator for generating 32 oscillations of different frequencies, Figure 4($c$) is a theoretical circuit diagram of control apparatus for controlling the transmission of oscillations generated by the arrangement of Figure 4($b$) in dependence upon signals generated by the automatic senders shown in Figure 4($a$), and Figure 4($d$) is a block schematic diagram of a transmitter for transmitting the oscillations selected by the arrangement of Figure 4($c$).

Figure 5 is a schematic diagram of a receiving terminal for use with the transmitting terminal of Figure 4. It is convenient to divide Figure 5 into ten parts, Figures 5($a$) to 5($h$) and 5($j$) and 5($k$), of which Figures 5($a$), ($b$), ($c$), ($d$), ($e$) and ($f$) are block schematic diagrams of parts of a receiver for use in receiving signals transmitted by the arrangement of Figure 4, Figures 5($g$), ($h$) and ($j$) show parts of a distributor for distributing the output of the arrangement shown in Figure 5($f$) to 15 channels and for providing in each channel voltages of a form suitable for operating a teleprinter, and Figure 5($k$) is a block diagram of a preferred form of synchronising circuit.

Figure 6:
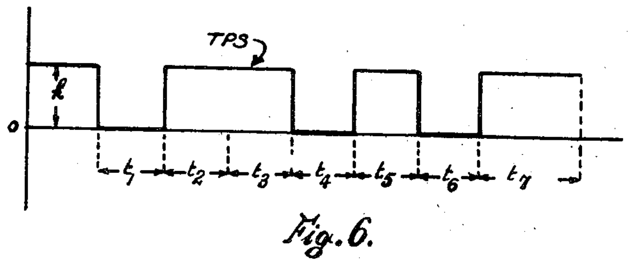
Figure 5J:
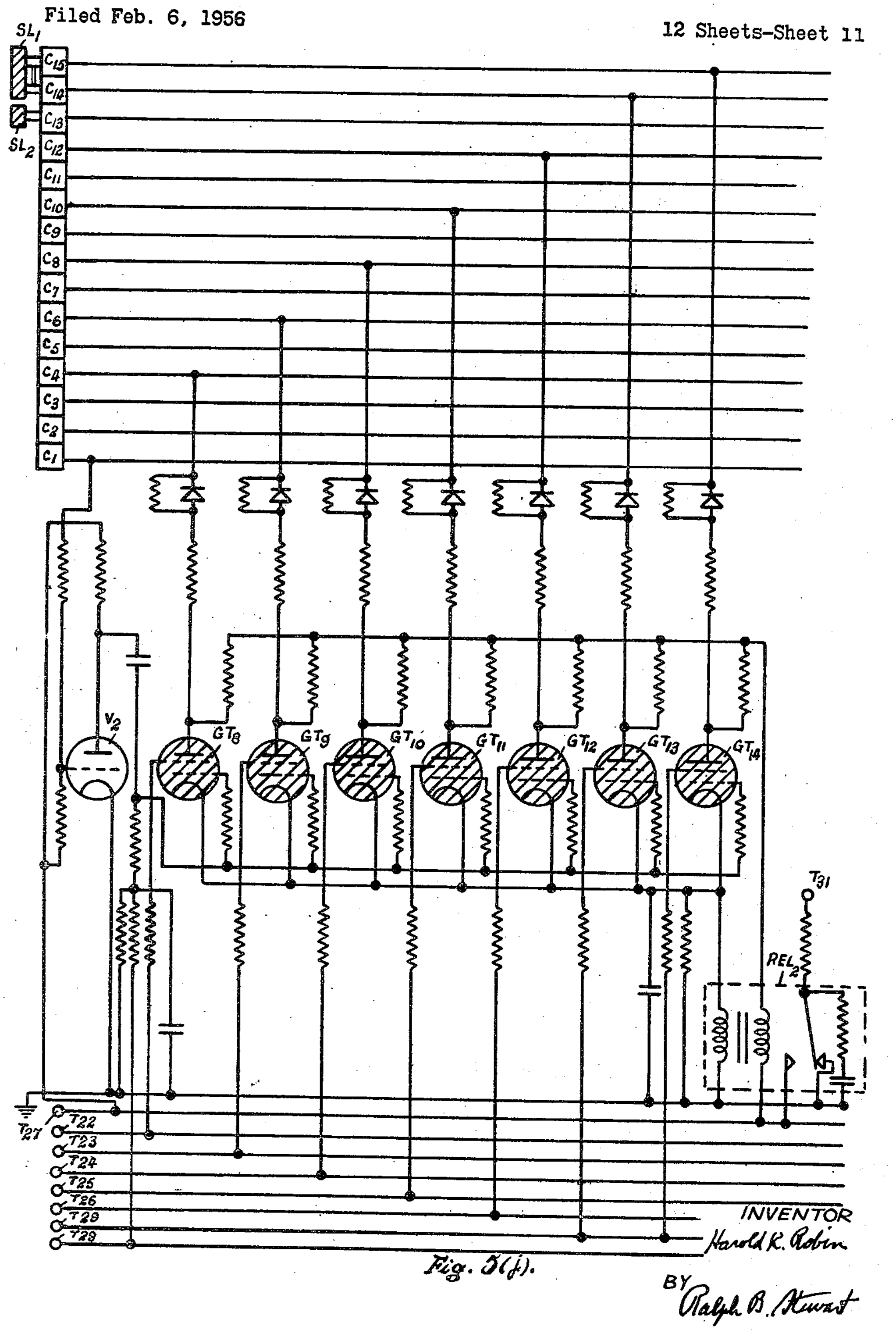
Figure 5K:
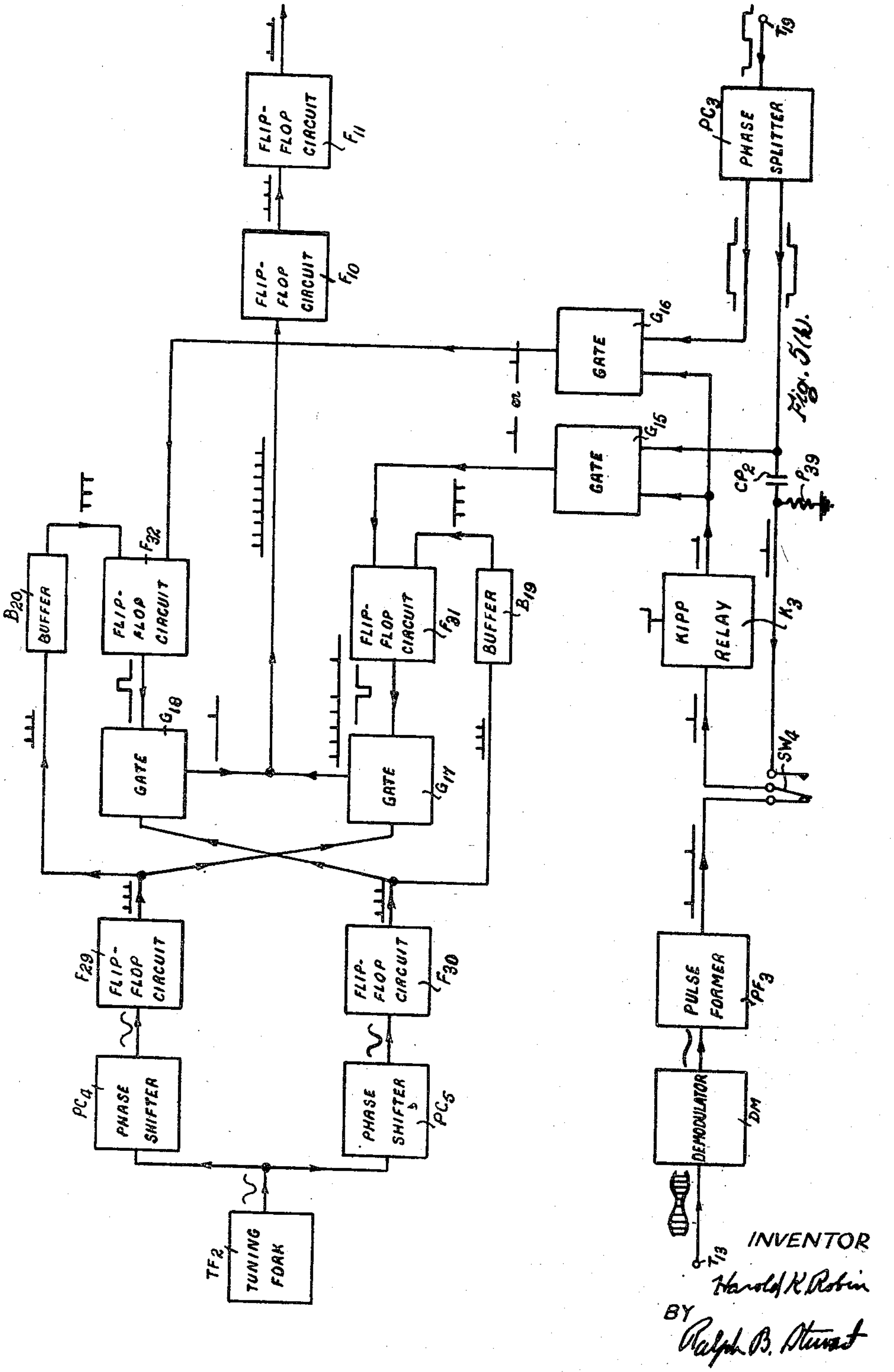

Figure 6 is a diagram illustrating the wave form of a teleprinter signal.

Referring to Figure 1, a keying unit 10 is connected to a modulator 11 and serves to apply to the modulator a series of mark and space signals of opposite polarities. An oscillator 12 is connected to the modulator 11 and the mark and space signals applied to the modulator frequency-modulate the oscillations provided by the oscillator 12 to two values alternately. The output from the modulator 11 is amplified at 13 and transmitted from an aerial 14. It will be assumed that the duration of the mark and space signals are 20 milliseconds or an integral multiple thereof and that the difference between the frequencies of the transmitted oscillations is 800 c./s.

The transmitted oscillations are received at an aerial 15 and applied through an R. F. amplifier 16 to a frequency changer 17 where they are mixed with oscillations from a local oscillator 18 to produce beats of intermediate frequency. The intermediate frequency oscillations are amplified in an intermediate frequency amplifier 19 whose output is applied to two transmission channels formed of networks 20 and 21. It will be assumed that the oscillations of intermediate frequency are alternately of 1.0 mc./s. and 1.0008 mc./s. respectively representative of the mark and space signals.

The network 20 includes a delay line 22 designed to provide a time delay of 20 milliseconds. The network 21 includes a balanced-modulator 23 to which the oscillations of intermediate frequency are applied as carrier. An oscillator 24 of 1000 c./s. is connected to the modulator 23 to modulate the oscillations of intermediate frequency applied to the network 21. The balanced modulator 23 may be of any suitable type and it is arranged that the output thereof is the upper side-band whereby a frequency of 1000 c./s. is added to the oscillations applied to the network 21. Thus modulator 23 acts as a frequency changing device to increase the frequency of the applied signal by a fixed amount and the oscillations from the network 21 are always of higher frequency than the oscillations appearing at the output of the network 20.

The outputs of the two networks are applied to a balanced modulator 25 whose output is arranged to be the lower side-band arising from the modulation of the output of the network 21 by the output from the network 20.

In Figure 2($a$) a full line curve 26 represents the oscillations of intermediate frequency applied to the two networks 20 and 21 of Figure 1. Each of the intervals $t_1$, $t_2$, $t_3$ and $t_4$ are of 20 milliseconds and it will be seen that the mark and space signals are each of 20 milliseconds. Figure 2($b$) represents the output from the network 20 of Figure 1 and is identical with Figure 2($a$) but delayed by 20 milliseconds. Figure 2($c$) represents the output from the network 21 and it will be seen from the curve 26″ that the output from the network 21 is in phase with the applied oscillations as shown in Figure 2($a$) but the oscillations have been modified by the addition of 1000 c./s.

During an interval $t_1$ an oscillation of 1.001 mc./s. is applied to the modulator 25 of Figure 1 as a carrier and is modulated by an oscillation of 1.0008 mc./s. from the network 20. Thus the frequency of the lower side-band is 200 c./s. During the interval $t_2$ an oscillation of 1.0018 mc./s. is applied to the modulator 25 from the network 21 and is modulated by an oscillation of 1.0 mc./s. from the network 20. Thus the frequency of the lower side-band during the interval $t_2$ is 1,800 c./s.

Referring to Figure 3, the full line curve 26 of Figure 3($a$) represents the input to the two networks 20 and 21, the full line curve 26′ of Figure 3($b$) represents the resulting output from the network 20, and the full line curve 26″ of Figure 3($c$) represents the output from the network 21. In Figure 3 the mark and space signals are of unequal durations but each commences at the beginning of one of the intervals $t_1$ to $t_6$. These intervals are, as in Figure 2, each of 20 milliseconds duration.

It will be seen from Figure 3($a$) that the first burst of oscillations applied to the two networks 20 and 21 of Figure 1 is of a frequency of 1.0 mc./s. and a duration of 40 milliseconds extending over the intervals $t_1$ and $t_2$. This first burst is delayed by 20 milliseconds in the network 20 and appears as shown in Figure 2($b$) at the output of the network 20. The output of the network 21 is as shown in Figure 3($c$) and is in phase with the input but increased in frequency by 1000 c./s. The second burst of oscillations applied to the networks 20 and 21 is of a frequency of 1.0008 mc./s. and a duration of 20 milliseconds. The third burst is of the frequency 1.0 mc./s. and occupies the interval $t_4$ of 20 milliseconds and the fourth burst is of the frequency 1.0008 mc./s. and is of 40 milliseconds occupying the intervals $t_5$ and $t_6$.

Referring to Figure 3($d$), this illustrates the output of the balanced-modulator 25 of Figure 1 on the application thereto of the bursts of oscillations shown in Figure 3($b$) and ($c$). During the interval $t_1$ the output of the modulator 25 is the difference between the frequencies 1.0008 and 1.001 mc./s., that is to say 200 c./s. as shown in Figure 3($d$). During the interval $t_2$ the difference frequency is 1000 c./s., during $t_3$ it is 1,800 c./s., during $t_4$ it is 200 c./s., during $t_5$ it is 1,800 c./s. and during $t_6$ it is 1,000 c./s.

Referring again to Figure 1, the output of the balanced-modulator 25 is applied to two filters 27 and 28 which are tuned to 200 c./s. and 1,800 c./s. respectively. The outputs of the two filters 27 and 28 are applied through two rectifiers 29 and 30 respectively to the input terminals of a bi-stable multi-vibrator or flip-flop circuit 31. The output of the circuit 31 is applied to a polarised telegraph relay 32 whose two fixed contacts 33 and 34 are connected to opposite poles of a battery 35 which has a centre tap connected to earth and the moving contact of the relay 32 is connected to an output terminal 36.

If signals as shown in Figure 2($a$) are received the output of the balanced modulator 25 is in the form of bursts of oscillations of equal durations whose frequencies are alternately 200 c./s. and 1,800 c./s. as previously explained and hence are passed by the two filters 27 and 28 alternately to the flip-flop circuit 31. Thus the output of the flip-flop circuit changes polarity every 20 milliseconds and the voltage appearing at the output terminal 36 likewise changes polarity every 20 milliseconds whereby the original mark and space signals are reproduced.

If bursts of oscillations as shown in Figure 3(*a*) are received during the period $t_1$ the output of the balanced-modulator 25 of Figure 1 is of the frequency 200 c./s. These oscillations are passed by the filter 27 and the relay 32 becomes energised in one sense. During the interval $t_2$ the output of the balanced-modulator 25 is of 1000 c./s. and is passed by neither of the two filters 27 and 28 and hence the energisation of the relay 32 remains unchanged. During the interval $t_3$ the output of the balanced-modulator 25 is of 1,800 c./s. and hence the energisation of the relay 32 is reversed whereby the polarity of the output at the terminal 36 becomes reversed. During the period $t_4$ the output of the balanced-modulator 25 is of 200 c./s. and hence a further reversal of the output of the relay 32 takes place. During the interval $t_5$ the output of the balanced-modulator 25 is again 1,800 c./s. and hence a further reversal of the output of the relay takes place and as the output during the interval $t_6$ is 1,000 c./s. and is passed by neither of the two filters 27 and 28 the polarity of the output during the interval $t_5$ is maintained during the interval $t_6$.

Thus the signals appearing at the output of the relay 32 are in phase with the bursts as shown in Figure 3(*a*) and the original mark and space signals are reproduced. Although an arrangement has been described in which there is no gap between mark and space signals it will be understood that so long as the duration of each burst is sufficiently long to ensure that at least a part of each burst appearing at the output of the network 20 coincides with the next succeeding burst appearing at the output of the network 21 to produce the appropriate output from the balanced-modulator 25 satisfactory results will be achieved.

Furthermore the delay network 22 need not provide a delay of 20 milliseconds as described. Satisfactory results will not be achieved if the delay time is longer than 20 milliseconds but the delay time may be made equal to 20 milliseconds divided by an integer.

In order to make the band-width of the filters 27 and 28 as small as possible, however, it is necessary to make the bursts of oscillations appearing at the output of the balanced-modulator 25 as long as possible and hence it is preferred to make the time delay equal to 20 milliseconds and to transmit the bursts without gaps between them.

An application of the invention to the transmission of teleprinter signals will now be described with reference to Figures 4, 5 and 6.

Figure 4(*a*) shows fifteen automatic senders $A_1$ to $A_{15}$ of known kind, each having five peckers (not shown), a pecker bar (not shown) and an operating coil, the fifteen operating coils being shown at $L_1$ to $L_{15}$ respectively. These senders may each be a "Western Union type 22A tape transmitter." The intelligence to be transmitted is in the form of sets of coded perforations in fifteen, five-unit, standard, perforated tapes, which are passed through the senders $A_1$ to $A_{15}$ respectively. The senders are of the notched-on type, that is to say, each time the operating coil of a sender is energized the tape in the sender is moved a predetermined distance (the distance between adjacent sets of coded holes in the tape) by a toothed wheel whose teeth engage perforations in the tape additional to the coded perforations. The toothed wheel is arranged to rotate through a suitable angle each time the operating coil is energized. Each time the tape comes to rest, one or more peckers make contact with the pecker bar depending upon the code of the perforations in the tape.

One terminal of each of the coils $L_1$ to $L_{15}$ is connected to one terminal of a battery $E_1$ whose other terminal is earthed, and the other terminals of the coils $L_1$ to $L_{15}$ are connected to fixed contacts 1 to 15 respectively of a distributor $D_1$ whose moving contact 16 is earthed. Rotation of the contact 16 causes the coils $L_1$ to $L_{15}$ to be energised in turn and hence causes the tapes in the senders $A_1$ to $A_{15}$ to be notched-on in turn. The moving contact 16 is arranged to be rotated by a motor (to be described later) at a speed of 360 R. P. M. whereby the senders $A_1$ to $A_{15}$ are each operated six times per second.

The pecker bars of the fifteen senders are connected to the fifteen fixed contacts 1 to 15 respectively of a second distributor $D_2$ whose moving contact **16*a*** is earthed. The moving contact of the distributor $D_2$ is mechanically connected to the moving contact of the distributor $D_1$ by any suitable means shown as a broken line S whereby the two moving contacts rotate at the same speed. The pecker bars of the senders $A_1$ to $A_{15}$ are therefore earthed in turn, and each pecker bar is earthed six times a second. The moving contact of the distributor $D_2$ is arranged to lag on that in the distributor $D_1$ as shown.

Five diode rectifiers $R_1$ to $R_5$ are provided for each of the senders $A_1$ to $A_{15}$ and the peckers of each sender are connected to the anodes of the five rectifiers respectively associated therewith. The cathodes of the fifteen sets of five rectifiers $R_1$ to $R_5$ are connected to terminals $T_1$ to $T_5$ respectively. These terminals are connected through resistors $P_1$ to $P_5$ respectively to the negative terminal of a 50-volt battery $E_2$ whose positive terminal is earthed.

The terminals $T_1$ to $T_5$ are normally, therefore, at a potential of −50 volts relatively to earth. Each time one or more of the peckers in the senders is earthed through its pecker bar and the distributor $D_2$, however, the potential of the one of the terminals $T_1$ to $T_5$ to which the pecker is connected, is raised to earth potential. The pattern of the potentials of the terminals $T_1$ to $T_5$ is, therefore, determined at any one instant by the code of the perforations in the tape in the sender whose pecker bar is earthed at that instant. This pattern is determined by the senders $A_1$ to $A_{15}$ in turn and changes 90 times a second (six per second per sender), that is to say each pattern lasts for about 11.11 milliseconds.

It will be appreciated that the senders are each operated at the standard teleprinter rate of six characters per second, and it is thought that 15 channels is the most that can be operated satisfactorily in a time division multiplex system over long distance radio links. It is well known that reflections by the ionosphere of a long distance signal may cause the duration of a signal to vary up to three milliseconds. Signals of durations less than about ten milliseconds are liable, therefore, to be mutilated to the extent of producing errors at a receiving station. The figure of 11.11 milliseconds per signal provides an adequate margin to ensure satisfactory results under normal ionospheric conditions, and allows 15 channels to be provided.

Referring now to Figure 4(*b*) the electrostatic generator shown comprises a wheel W which has 32 rings of apertures AP formed therein. The wheel W is rotated by a synchronous motor $M_1$ supplied with power at 60 c./s. from a tuning fork $TF_1$. The tuning fork $TF_1$ is arranged to be maintained in oscillation in known manner at a frequency of 1,800 c./s. to within one part in a million. The tuning fork drive may be "type F. K. 2 fork drive" made by Times Telephoto Equipment Incorporated. The output from the fork is passed through a 30:1 frequency divider FD and a power amplifier PA to the motor $M_1$. A series motor SM is employed for running the wheel up to the synchronous speed of 1,800 R. P. M., and the shaft of the motor SM is coupled through a gear GR of 5:1 ratio to a shaft S which may be directly connected to the moving contacts of the distributors $D_1$ and $D_2$ of Figure 4(*a*).

Thirty-two collector electrodes (not shown) are arranged close to the rings of apertures respectively in the wheel W, and the wheel is given a suitable potential by any suitable means (not shown). The number of perforations in the thirty-two rings is arranged to be such that the apertures in the thirty-two rings pass the collector electrodes respectively at the rate of 1,800 per second, 1,890 per second, and so on, in steps of 90 to 4,590 per second. Audio-frequency oscillations of frequencies 1,800 c./s. and in 90 c./s. steps to 4,590 c./s. are therefore made available at the collector electrodes. These electrodes are connected to the thirty-two cores of a thirty-two core cable CA.

An additional ring of three, equally-spaced apertures AP' is provided in the wheel W for the generation of triggering pulses for a purpose to be described later. A collector electrode (not shown) co-operates with the additional ring of apertures AP' and is connected to a terminal $T_6$. Pulses therefore appear at the terminal $T_6$ at the rate of one pulse every 11.11 milliseconds. An alternating current generator ACG is connected to the shaft of the wheel W and provides an output of 90 c./s. for a purpose to be described later. The output of this generator is applied to an output terminal $T_7$.

Referring now to Figure 4(*c*) this shows a selector arrangement for selecting oscillations from the arrangement shown in Figure 4(*b*) in dependence upon the potentials on the terminals $T_1$ to $T_5$ of Figure 4(*a*). The cable CA and terminal $T_6$ are those shown in Figure 4(*b*), and terminals $T_1$ to $T_5$ are those shown in Figure 4(*a*). The terminals $T_1$ to $T_5$ are connected to the control terminals of five gates $G_1$ to $G_5$ respectively whose input terminals are connected together and to the output terminal of a Kipp relay $K_2$, that is to say a relay which provides an output pulse some time after the application thereto of an operating pulse. The five gates $G_1$ to $G_5$ may conveniently be pentode valves, the terminals $T_1$ to $T_5$ being connected to the suppressor grids of the five pentodes respectively, and the control grids being connected together and to the Kipp relay $K_2$. The Kipp relay may be a form of "one shot" multivibrator such as is described in "Principles of Radar" by the staff of the Massachusetts Institute of Technology, published by McGraw-Hill, chapter 2, article 15.

The outputs of the gates $G_1$ to $G_5$ are applied through delay devices $D_2'$, $D_3'$ . . . $D_5'$ to the input terminals of five cascade-connected "flip-flop" circuits $F_1$ to $F_5$ respectively. A "flip-flop" circuit is a circuit having two input terminals and which can assume either of two stable conditions on the application of a pulse to one or the other or both of the two input terminals and a common form of flip-flop circuit is one in which two triode valves are provided, the anode of each being connected to the control grid of the other through direct current paths each including a resistor and a capacitor connected in parallel. One stable condition is that in which one of the valves is conducting and the other is non-conducting and the other stable condition is that in which the valve originally conducting is non-conducting and that originally non-conducting is conducting. The application of a positive-going pulse to the control grid of the valve which is non-conducting causes this valve to become conducting and the other to become non-conducting. Similarly the application of a negative-going pulse to the control grid of the valve which is conducting causes this valve to become non-conducting and the other to become conducting. The two input terminals of the flip-flip circuit may therefore be connected to the control grids of the two valves respectively, and two output terminals may be connected to the anodes of the two valves respectively.

The pairs of output terminals of the flip-flop circuits $F_1$ to $F_5$ are connected through buffer stages $B_6$ to $B_{10}$ respectively to a rectifier matrix GM. One output terminal of each of the flip-flop circuits, except $F_5$, is connected to the input circuit of the next to provide a cascade connection. The delay devices $D_2'$ to $D_5'$ delay the pulses fed therethrough in such a manner that pulses appearing simultaneously at the outputs of the gates $G_1$ to $G_5$ are applied in succession to the flip-flop circuits $F_1$ to $F_5$, a pulse from the gate $G_2$ being applied after the application of a pulse from the gate $G_1$, a pulse from the gate $G_3$ being applied after the application of a pulse from the gate $G_2$ and so on. The delay between the application of one pulse and the next in the succession is made such that any cascade action arising from the application of a pulse in the succession is completed before the application of the next pulse in the succession.

The action of the arrangement of Figure 4(*c*) as so far described may be as follows:

It will be assumed that all the flip-flop circuits $F_1$ to $F_5$ are initially in their "switched-off" condition. The Kipp relay $K_2$ is arranged to provide an output pulse a few microseconds after the application of a pulse at the terminal $T_6$. The output pulse from the Kipp relay is of a duration of only a few microseconds. This pulse is applied to the gates $G_1$ to $G_5$ and is reproduced at the outputs of the gates whose control terminals are connected to those of the terminals $T_1$ to $T_5$ which are at earth potential. The remaining gates provide zero output. Those of the five flip-flop circuits $F_1$ to $F_5$ connected to the gates which pass the pulse from the Kipp relay become "switched on." The five flip-flop circuits are, therefore, set up in conditions determined by the binary code of the set of perforations in the tape engaged by the peckers of the one of the senders $A_1$ to $A_{15}$ [Figure 4(*a*)] whose pecker bar is earthed at that instant through the distributor $D_2$.

During the next interval of 11.11 milliseconds the Kipp relay provides a further output pulse and a further set of pulses is applied to the terminals $T_1$ to $T_5$ from a difference one of the senders.

Thus the pulse applied to the gates from the Kipp relay is passed by those of the gates whose control terminals are connected to those of the terminals $T_1$ to $T_5$ which are at earth potential.

If a pulse is applied from one of the gates to its corresponding flip-flop circuit and that circuit is already "switched-on" as a result of the application thereto of a previous pulse this flip-flop circuit becomes "switched-off," and delivers an output pulse to the next flip-flop circuit in the cascade $F_1$ to $F_5$. If on the other hand the flip-flop circuit is "switched-off" the application of the pulse thereto causes the flip-flop circuit to be "switched-on."

Thus the five flip-flop circuits are caused to assume conditions related to the difference between the successive pairs of sets of pulses applied to the terminals $T_1$ to $T_5$.

Out of every 11.11 milliseconds (the time between successive pulses applied to the terminal $T_6$ and the time between successive movements of the tapes in the fifteen senders $A_1$ to $A_{15}$ of Figure 4(*a*)) only a few microseconds are used to set up the flip-flop circuits $F_1$ to $F_5$. This allows considerable latitude in the resetting (notching-on) of the tapes in the senders $A_1$ to $A_{15}$ [Figure 4(*a*)], in the movement of the peckers during the notching-on periods, and in the positions of the moving contacts 16 in the distributors $D_1$ and $D_2$.

The two output terminals of the five flip-flop circuits are connected to the input terminals of five push-pull buffer stages $B_6$ to $B_{10}$ respectively, and the outputs of the five buffers $B_6$ to $B_{10}$ are applied to the five pairs of input terminals of a matrix GM of germanium rectifiers. A suitable rectifier matrix is described in "Proc. I. R. E., February 1949, page 139, under the title "Rectifier Networks for Multi-Position Switching," by D. R. Brown. The matrix has thirty-two output terminals and it is arranged in known manner that irrespective of the outputs of the five buffer stages $B_6$ to $B_{10}$ as determined by the settings of the five flip-flop circuits $F_1$ to $F_5$, only one of the output terminals is at any instant at earth potential, the remainder being at say 10 volts negative relatively to earth. The thirty-two different combinations of the settings of the flip-flop circuits $F_1$ to $F_5$ cause the potential of different ones of the thirty-two output terminals of the matrix to be raised to earth potential.

The thirty-two output terminals of the matrix GM are connected to the control terminals of thirty-two gates respectively, shown as a block $G_6$. Only one of these gates is open, therefore, at any one instant. The cores of the thirty-two core cable CA are connected to the input terminals of the thirty-two gates $G_6$ respectively and it is arranged that the thirty-two gates have a common output terminal $T_8$. The frequency of the oscillation at the terminal $T_8$ at any instant is determined by the difference between the code of the perforations in the tape in that one of the senders $A_1$ to $A_{15}$ which has its pecker bar earthed at that instant through the distributor $D_2$ of Figure 4(*a*) and the next preceding code.

It is arranged that the frequencies of the oscillations transmitted correspond in a particular manner to the 32 five-digit binary codes set up in the flip-flop circuits $F_1$ to $F_5$. When $F_1$ is switched "on" and the other four are switched "off," corresponding to code 1 an oscillation of frequency 2970 c./s. is transmitted. When $F_2$ is switched "on" and the other four switched "off," correponding to code 2, an oscillation of frequency 3060 c./s. is transmitted, and so on through the codes in steps of 90 c./s. up to code 19 when the highest frequency, 4590 c./s., is transmitted. The next code 20, $F_3$, $F_5$ "on" and $F_1$, $F_2$, $F_4$ "off," causes an oscillation of frequency 1800 c./s. to be transmitted and so on through the codes 20 to 31, in steps of 90 c./s. up to the code 31 when all five flip-flop circuits are switched "on" and an oscillation of frequency 2790 c./s. is transmitted, and finally to code 32, when all flip-flop circuits are switched off and an oscillation of frequency 2880 c./s. is transmitted. It will be seen that the thirty-two oscillations generated by the arrangement of Figure 4(*b*) are all harmonically related, and the purpose of this is to facilitate the suppression of transients when the frequency of the oscillations at the terminal $T_8$ makes an abrupt change. By suitable selection of the instants of occurrence of the pulses at the terminal $T_6$, or by suitable adjustment of the variable delay device VAD associated with the Kipp relay $K_2$, it can be arranged that the abrupt changes in frequency at the terminal $T_8$ occur when the oscillations are passing through zero.

Referring to Figure 4(*d*) this shows a limiter L followed by four flip-flop circuits $F_6$ to $F_9$ connected in cascade. The flip-flop circuits $F_6$ to $F_9$ are arranged in known manner to act as frequency dividers each having a division ratio of 2:1. Suitable frequency dividers are described in "Principles of Radar" by the staff of the Massachusetts Institute of Technology, published by McGraw-Hill, chapter 2, article 14. An output is taken from each of the flip-flop circuits $F_6$ to $F_9$ and applied to the four mixed contacts respectively of a selector switch $SW_1$. The moving contact of the selector switch $SW_1$ is connected to a modulator MD to which is also fed the 90 c./s. oscillation at the terminal $T_7$. The oscillations applied to the modulator from the switch $SW_1$ are amplitude-modulated therefore at 90 c./s. and it is arranged that the depth of modulation is about 50%. The purpose in providing this modulation is to facilitate synchronisation at a receiver as will be described later. The output of the modulator is passed through a cathode-follower stage $CF_1$ and a transformer $N_1$ to a low-pass filter Z having a cut-off frequency of 5,000 c./s. The output of the low-pass filter is applied to a transmitter TR by means of a suitable transmission line. At the transmitter the 90 c./s. modulation is removed and the demodulated tones are applied to produce frequency shift of a carrier in known manner. The frequency of the frequency-modulated carrier is then multiplied and the 90 c./c. modulation reapplied. The switch $SW_1$ is given a setting dependent upon the degree of frequency multiplication employed in the transmitter TR, whereby the modulation frequencies transmitted from the transmitter TR are the same as those appearing at the terminal $T_8$.

Receiving equipment will now be described which demodulates signals received from the transmitter TR of Figure 4(*d*), measures the frequency of each 11.11 milliseconds burst of oscillations received to decide which it is of the thirty-two possible frequencies, establishes a five-unit code corresponding to that at the transmitting terminal causing oscillations of the identified frequency to be transmitted, distributes the five-unit codes to fifteeen channels, and produces voltages in each channel of the form necessary for operating a standard teleprinter.

Each burst of oscillations lasts for 11.11 milliseconds and as previously explained, the ionosphere may cause changes in the duration of each signal up to about 3 milliseconds. An arrangement will be described whereby the first and last quarter of each signal is disregarded and measurements are made on the centre portion, 5.55 milliseconds duration, of each burst of oscillations.

Assuming first of all that all five of the flip-flop circuits $F_1$ to $F_5$ of Fig. 4(*c*) are in the switched-off condition. When pulses are applied through gates $G_1$, $G_3$ and $G_5$ corresponding to code 21, flip-flop circuits $F_1$, $F_3$ and $F_5$ are switched on thereby and the signal of frequency 1890 c./s. is transmitted to the receiver. When the next teleprinter signal corresponding to, say, code 10, causes pulses to be applied to the flip-flop circuits $F_2$ and $F_4$, these two flip-flop circuits become switched on whereby all five are then in the "switched-on" condition and a signal of frequency 2790 c./s. corresponding to code 31 is transmitted. The frequency of this signal is, clearly, not directly related to the teleprinter character, but the difference between the frequency of the first transmitted signal and the second is representative of that character.

Assume that the next teleprinter character to be transmitted, corresponding to code 1, is to be transmitted. A pulse is transmitted through the gate $G_1$ to the flip-flop circuit $F_1$. This flip-flop circuit is switched off thereby and by its cascade action causes $F_2$ to switch off, which in turn causes $F_3$ to switch off and so on until all are switched off. A signal of frequency 2880 c./s. is then transmitted. The frequency of this signal is, as before, not directly related to the teleprinter character but such that the difference between the frequency of the transmitted signal 2880 c./s. and that of the last transmitted signal (2790 c./s.) is representative of the character.

Figure 5(*a*) is a schematic diagram of part of a suitable receiver. The signals are received at an aerial AE and pass by way of an R. F. amplifier RFA and a frequency changer FC to an intermediate frequency amplifier IFA in accordance with standard superheterodyne receiver technique. The output of the amplifier IFA is passed into two networks, one comprising a delay line and the other a balanced modulator $BM_1$ to which an oscillator LO is also connected.

The delay network DL provides a delay of 11.11 milliseconds, that is to say, a delay equal to the duration of each received signal. A signal appears, therefore, at the output of the delay network DL at the same time as the next succeeding signal appears at the output of the amplifier IFA. The local oscillator LO is of 5760 c./s. As is well known, drift in the frequency of audio-frequency oscillators can be made negligibly small and hence the frequency of the oscillator LO can be assumed to be 5760 c./s. at all times. The balanced modulator $BM_1$ serves to add 5760 c./s. to the frequency of each signal applied thereto from the amplifier IFA.

The outputs from the delay network DL and the balanced modulator are heterodyned one against the other in a second balanced modulator $BM_2$ and the difference frequency is selected and applied to the terminals $T_9$ and $T_{10}$.

Thus there appears at the terminals $T_9$ and $T_{10}$ bursts of oscillations at frequencies in the range 2970 c./s. to 8550 c./s. The component of modulation at 90 c./s. is then extracted, and the remaining audio-frequency oscillations are amplified and limited, and the 90 c./s. modulation is reapplied. The resulting signals are transmitted to the input terminals $T_9$ and $T_{10}$ of Figure 5(*b*). These terminals are connected through a switch $SW_2$ and a transformer $N_2$ to an input control circuit $IC_1$ which may be any suitable variable attenuator. The signals are applied from the input control-circuit $IC_1$ to an amplifier $AMP_1$ and thence to two phase-changing circuits $PC_1$ and $PC_2$. These circuits provide two outputs whose phases differ by 90° over a wide frequency range. Examples are given in an article by R. B. Dome in "Electronics," December 1946, page 112. The phase shift effected by the circuit $PC_1$ is made +45° and that effected by the circuit $PC_2$ is made −45° irrespective of frequency. The outputs of the two phase-changing circuits $PC_1$ and $PC_2$ are applied to a pulse-forming circuit $PF_1$ which operates in known manner to provide two trains of pulses at twice the frequency of the oscillations applied thereto displaced 90° relatively to one another. This pulse forming circuit provides two differentiated pulses of like polarity from a single cycle of an input oscillation and may operate by limiting to a square wave form in a push-pull circuit and feeding the push-pull outputs from the anodes of the push-pull circuit through diodes into a differentiating network. In this way one positive (or negative) pulse is obtained for each crossing of the mean potential in the input wave-form. A further pulse forming circuit $PF_1'$ is provided for a purpose hereinafter to be described. For convenience the train of pulses at +45° will be referred to as the "working pulses" and the train of pulses at −45° will be referred to as the "timing pulses." The working pulses are applied through a cathode follower stage $CF_2$ to a terminal $T_{11}$, and the timing pulses are passed through a switch $SW_3$ and a cathode follower stage $CF_3$ to a terminal $T_{12}$. A connection is made from the secondary winding of the transformer $N_2$ to a terminal $T_{13}$ for a purpose to be described later.

Referring to Figure 5(*c*) a tuning fork $TF_2$ is kept in oscillation in known manner at a frequency of 1,800 c./s. to within one part in a million. Electrical oscillations at 1,800 c./s. derived from the tuning fork are passed to a synchronising circuit SC to be described later. The synchronising circuit produces a pulse from each half-cycle of the 1,800 c./s. oscillation and hence the output of the synchronising circuit is in the form of pulses having a recurrence frequency of 3,600 pulses per second. These are passed through two flip-flop circuits $F_{10}$ and $F_{11}$ connected in cascade and arranged in known manner (for example as already described) to function as frequency dividers each having a division ratio of 2:1. The output of the flip-flop circuit $F_{11}$ is therefore in the form of pulses having a recurrence frequency of 900 pulses per second.

The output of the flip-flop circuit $F_{11}$ is applied to a counter DR. This is in the form of what is commonly known as a decade ring and comprises ten flip-flop circuits, numbered 1 to 10 in the drawing, connected in such a manner that at one instant No. 1 flip-flop circuit is in one condition (when in this condition a flip-flop circuit will be said to be switched on) and flip-flop circuits Nos. 2 to 10 are in the other condition (when in this condition a flip-flop circuit will be said to be switched off). An example of a suitable decade ring is given by V. H. Regener in "Review of Scientific Instruments," 1946, volume 17, page 185. The first pulse applied to the counter DR switches off No. 1 flip-flop circuit and switches on No. 2 flip-flop circuit. The next pulse switches off No. 2 flip-flop circuit and switches on No. 3 and so on until ten pulses have been applied, the tenth pulse switching on No. 1 and switching off No. 10. This cycle of operations is repeated for every ten pulses applied and as the pulses have a frequency of 900 pulses per second there are 90 complete cycles of operation every second, or one every 11.11 milliseconds.

An output is taken from No. 1 flip-flop circuit in the counter DR through a buffer stage $B_{11}$ to a terminal $T_{14}$, an output is taken from No. 7 flip-flop circuit through a buffer stage $B_{12}$ to an output terminal $T_{15}$, an output is taken from No. 8 flip-flop circuit through a buffer stage $B_{13}$ to an output terminal $T_{16}$ and an output is taken from No. 9 flip-flop circuit through a buffer stage $B_{14}$ to an output terminal $T_{17}$, for purposes to be described later. It is arranged that each time the flip-flop circuits Nos. 1, 7, 8 and 9 are turned off they transmit a pulse to their respective output terminals $T_{14}$ to $T_{17}$. Outputs are also taken from flip-flop circuits Nos. 1, 3, 5 and 8 through buffer stages $B_{15}$ to $B_{18}$ respectively to an output terminal $T_{18}$, for a purpose to be described later.

Referring to Figure 5(*d*) the terminal $T_{14}$ is that shown in Figure 5(*c*) and is connected to one input terminal of a flip-flop circuit $F_{12}$. The terminal $T_{12}$ is that shown in Figure 5(*b*) to which the timing pulses are applied, and is connected to the input terminal of a gate $G_7$. The output terminal of the gate $G_7$ is connected to the other input terminal of the flip-flop circuit $F_{12}$. Each time a pulse appears at the terminal $T_{14}$, that is to say every 11.11 milliseconds, the flip-flop circuit $F_{12}$ is switched on. Whenever the circuit $F_{12}$ is switched on it applies a voltage to the control terminal of the gate $G_7$ which then opens. The next timing pulse appearing at the terminal $T_{12}$ after the gate $G_7$ is opened passes to the flip-flop circuit $F_{12}$ and switches it off. Each time the circuit $F_{12}$ is switched off output voltage therefrom serves to close the gate $G_7$ and to switch on a further flip-flop circuit $F_{13}$. This flip-flop circuit when switched on applies voltage through a cathode follower $CF_4$ to an output terminal $T_{19}$ and to the input terminal $T_{20}$ of a timing device CLC to be described later. The timing device CLC is arranged to provide a pulse at its output terminal $T_{21}$, 5.55 milliseconds after the pulse applied to the input terminal $T_{20}$. The output pulse at the terminal $T_{21}$ is applied to the flip-flop circuit $F_{13}$ to switch it off. As the pulses applied to the terminal $T_{14}$ occur every 11.11 milliseconds, the voltage at the terminal $T_{19}$ is in the form of an oscillation of square wave form, each half-cycle having a duration of 5.55 milliseconds and commencing at the instant of occurrence of a timing pulse applied to the terminal $T_{12}$. It will be remembered that the timing pulses lag 90° on the working pulses applied to the terminal $T_{11}$ of Figure 5 and hence each half-cycle of the oscillation of square wave form at the terminal $T_{19}$ commences midway between two working pulses.

Figure 5(*e*) shows in more detail the arrangement of the timing device CLC of Figure 5(*d*). A crystal-controlled oscillator CCO of a frequency of 92.16 kc./s. is connected to a flip-flop circuit $F_{14}$ which is arranged to derive pulses at a recurrence frequency of 92.160 pulses per second from the oscillations of 92.16 kc./s. These pulses are applied to a gate $G_8$ whose control terminal is the terminal $T_{20}$ shown in Figure 5(*d*). Each time the gate $G_8$ is opened by voltage applied to the terminal $T_{20}$, the pulses applied to the gate from the flip-flop circuit $F_{14}$ pass through the gate $G_8$ into a chain of flip-flop circuits $F_{15}$ to $F_{23}$ each arranged as a frequency-divider having a division ratio of 2:1. The overall division ratio of the chain is, therefore, 512:1 whereby the output of the last divider $F_{23}$ in the chain is at a frequency of 180 c./s. and has a period of 5.55 milliseconds. The output of the last divider $F_{23}$ is passed through a pulse forming circuit $PF_2$ to the terminal $T_{21}$ which is that shown in Figure 5(*d*). The first pulse appearing at the terminal $T_{21}$ occurs at an instant 5.55 milliseconds after the gate $G_8$ is opened, to within one part in 92,160. In this way the time interval of 5.55 milliseconds is measured with a degree of accuracy sufficient for the purposes of the present embodiment.

Referring to Figure 5(*f*), a gate $G_9$ has its input terminal connected to the terminal $T_{11}$ which is that shown in Figure 5(*b*) and hence the working pulses are applied to the input of the gate $G_9$. The control terminal of the gate $G_9$ is connected to the terminal $T_{19}$ which is that shown in Figure 5(*d*). The oscillation of square wave form applied to the terminal $T_{19}$ serves, therefore, to open and close the gate $G_9$ alternately for periods of 5.55 milliseconds respectively. It will be remembered that the bursts of working pulses are at any of the thirty-two possible frequencies ranging from 5940 pulses per second to 17,100 pulses per second. Irrespective, therefore, of the frequency of the pulses applied to the gate $G_9$ during each interval of 5.55 milliseconds when the gate $G_9$ is open, a whole number of pulses are applied to the gate from the terminal $T_{11}$. It will also be remembered that the timing pulses applied to the gate $G_7$ [Figure 2(c)] are delayed 90° on the working pulses. Each cycle of the square wave oscillation applied to the terminal $T_{19}$ commences, therefore, between two working pulses. The gate $G_9$ always opens, therefore, between two working pulses and closes between two working pulses provided the pulses are not affected by noise. In this way possible errors in operation due to the gate $G_9$ opening and closing during working pulses, are voided.

Figure 5A:
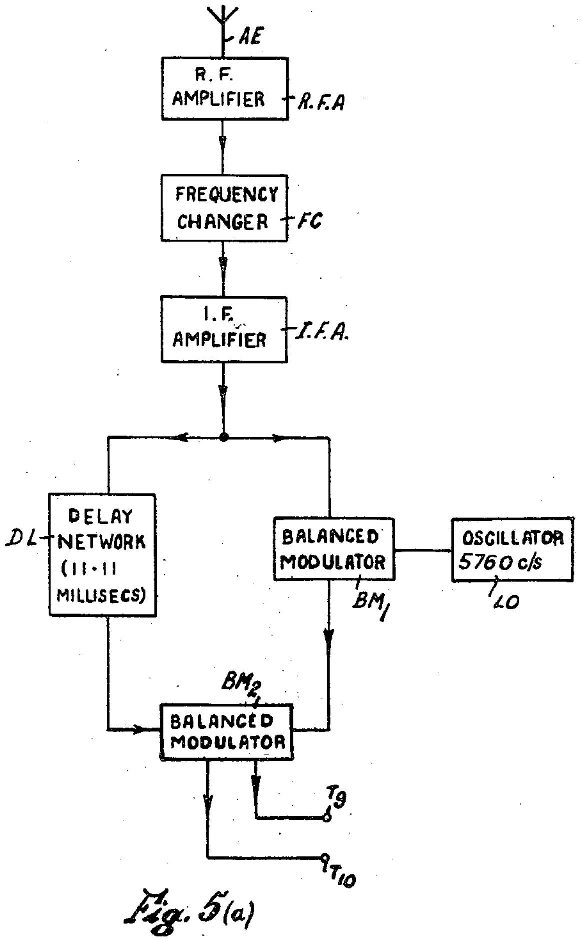
Figure 5B:
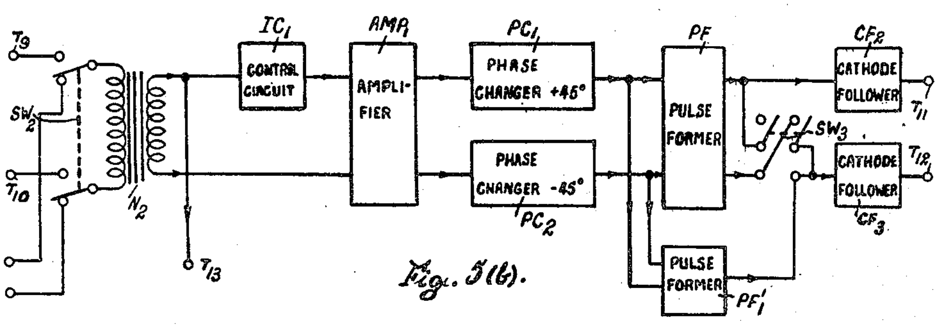

The synchronising circuit SC of Figure 5(c) serves, in a manner to be described later, to ensure that the gate $G_9$ opens about 2.77 milliseconds after the commencement of each burst of received oscillations applied to the terminals $T_9$ and $T_{10}$ [Figure 5(b)], whereby the first and last quarter of each received signal are prevented from passing through the gate $G_9$, and only the centre portion of 5.55 milliseconds passes through the gate $G_9$.

During each 5.55 milliseconds when the gate $G_9$ is open, working pulses pass through the gate $G_9$ into a five-digit binary counter having five flip-flop circuits $F_{24}$ to $F_{28}$ arranged in known manner. These are two-state flip-flop circuits arranged in cascade so that one of the circuits is operated from a preceding circuit. An example is given in "Electronics," September 1948, on page 111. At the beginning of each count the five flip-flop circuits $F_{24}$ to $F_{28}$ are in the "switched-off" condition as will be described later. It is arranged that the first pulse applied to the counter switches on the flip-flop circuit $F_{24}$, the next pulse switches off $F_{24}$ and switches on $F_{25}$, the third pulse leaves $F_{25}$ switched on and switches on $F_{24}$, the fourth pulse switches off $F_{24}$ and $F_{25}$ and switches on $F_{26}$ and so on. In this way when the five flip-flop circuits are switched on they indicate counts of 1, 2, 4, 8 and 16 respectively.

The pulses applied to the binary counter may be at any of the thirty-two frequencies ranging from 5,940 pulses per second to 17,100 pulses per second. The number of pulses passed into the binary counter during each operative period of 5.55 milliseconds may, therefore, be any of a series between 33 and 95. The application of that one of the series containing 64 leaves the flip-flop circuits $F_{24}$ to $F_{28}$ all switched off but the remainder leave one or more of the flip-flop circuits switched on, different ones, or different combinations, of the flip-flop circuits being left switched on after the application of groups of different numbers of pulses in the series (excluding 32). It is arranged that the conditions of the five flip-flop circuits $F_{24}$ to $F_{28}$ after the application of a burst of pulses thereto corresponds to the conditions of the five flip-flop circuits $F_1$ to $F_5$ respectively of Figure 1, which determine the frequency of the pulses in the burst, that is to say when flip-flop circuit $F_1$ is switched on flip-flop circuit $F_{24}$ is switched on and so on.

In this way a received oscillation is converted to a five-unit code directly without the need for filters.

Figure 5C:
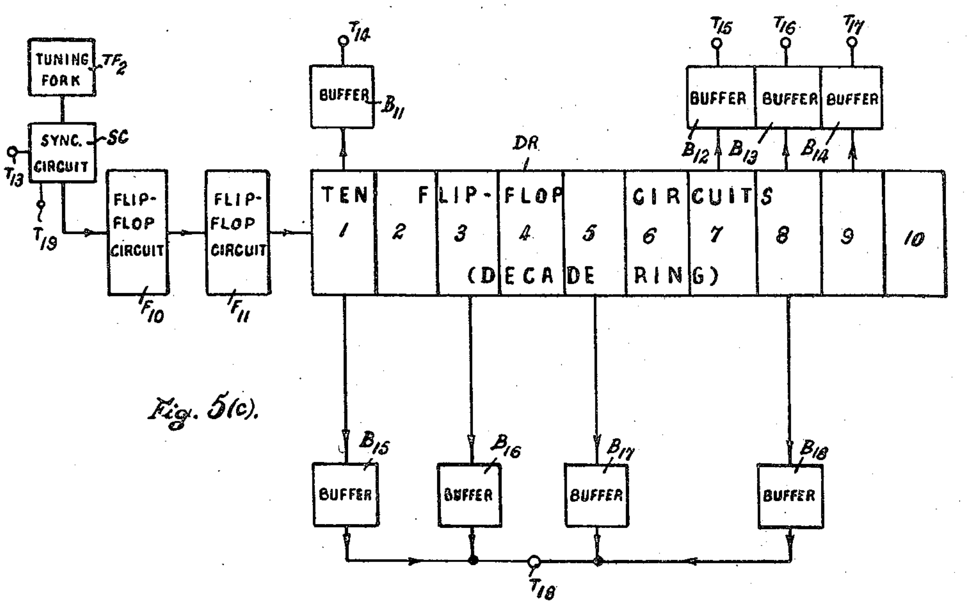
Figure 5D:
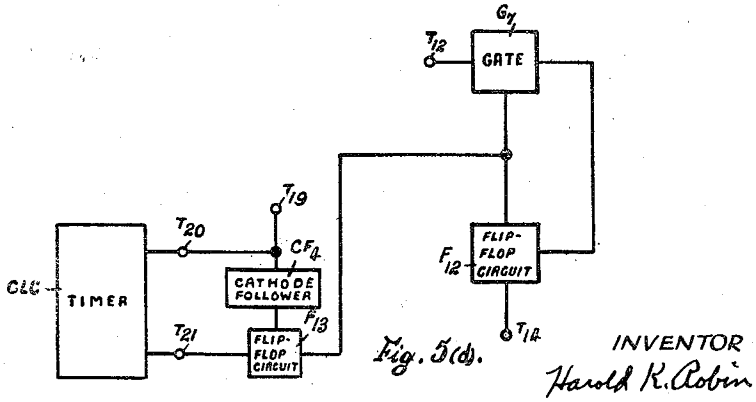
Figures 5E, 5F:
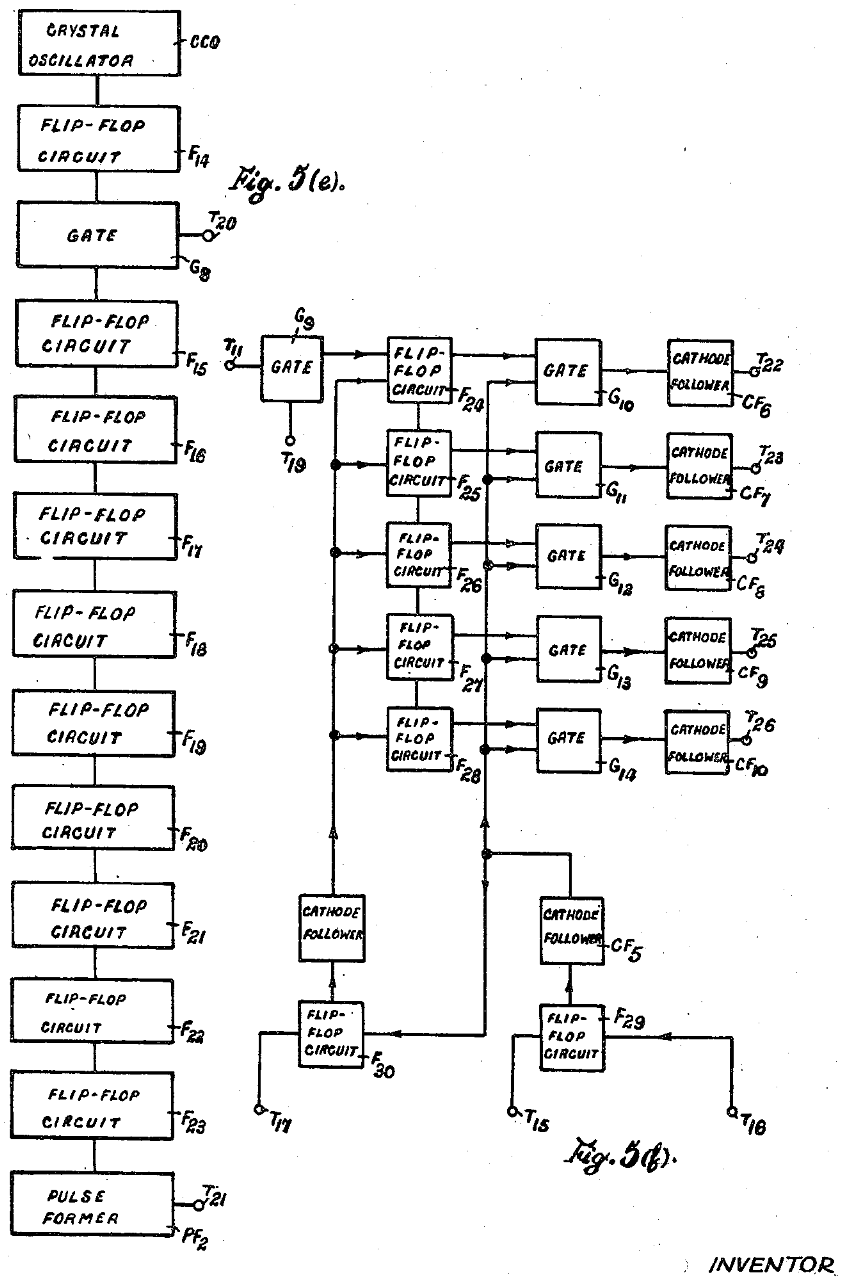
Figure 5H:
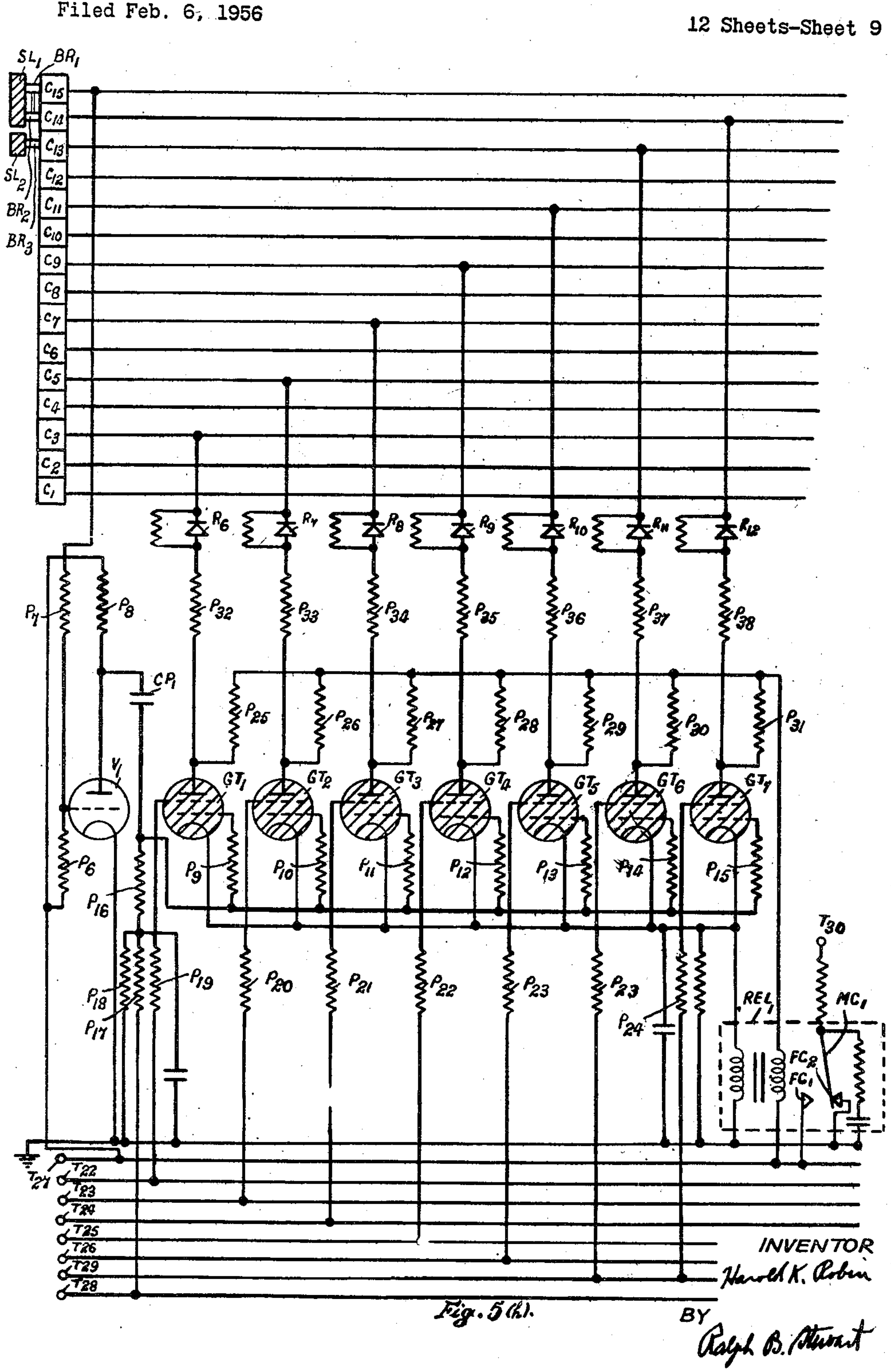
Figure 5G:
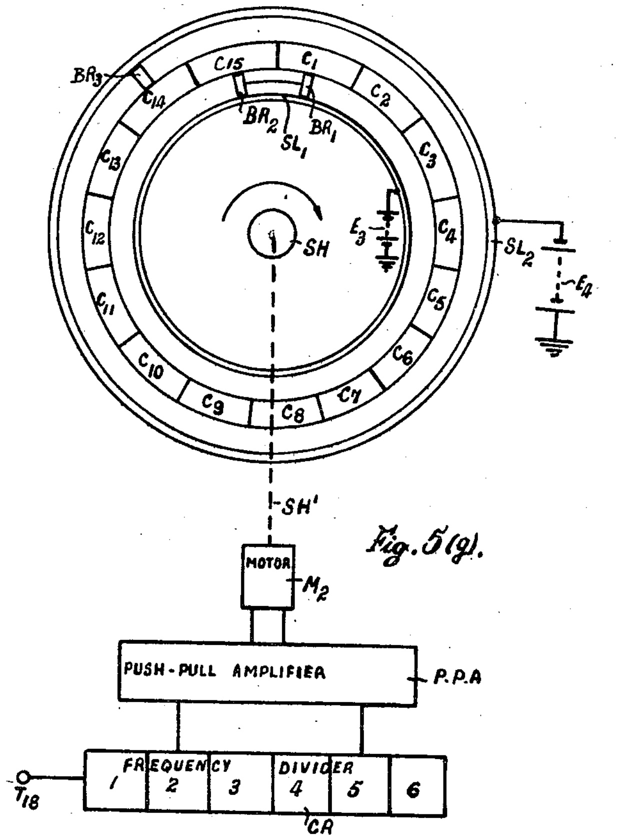

It will be remembered that the commencement of each 5.55 milliseconds period during which the gate $G_9$ is open is determined by the appearance of a pulse at the terminal $T_{14}$ [Figure 5(c)] connected to an output terminal of the No. 1 flip-flop circuit in the decade ring counter DR. About 1.11 milliseconds after the end of each 5.55 milliseconds period when the gate $G_9$ is open a pulse appears at the terminal $T_{15}$ which is connected to an output terminal of the No. 7 flip-flop circuit in the decade ring counter DR [Figure 5(c)]. This pulse is applied to switch on a flip-flop circuit $F_{29}$ [Figure 5(f)] whose output is applied through a cathode-follower $CF_5$ to a common control terminal of five gates $G_{10}$ to $G_{14}$. The outputs of the five flip-flop circuits $F_{24}$ to $F_{28}$ in the binary counter are applied to the input terminals of the five gates $G_{10}$ to $G_{14}$ respectively, and the outputs of the gates $G_{10}$ to $G_{14}$ are applied through five cathode-followers $CF_6$ to $CF_{10}$ respectively to five output terminals $T_{22}$ to $T_{26}$. Each time the gates $G_{10}$ to $G_{14}$ are opened by the flip-flop circuit $F_{29}$ the terminals $T_{22}$ to $T_{26}$ assume potentials dependent upon the conditions of the five flip-flop circuits $F_{24}$ to $F_{28}$ respectively in the binary counter.

About 1.11 milliseconds after the gates $G_{10}$ to $G_{14}$ are opened a pulse appears at terminal $T_{16}$. This pulse is applied to switch off the flip-flop circuit $F_{29}$ which in turn closes the gates $G_{10}$ to $G_{14}$ and switches on a flip-flop circuit $F_{30}$. This flip-flop circuit then applies a resetting voltage to the five flip-flop circuits $F_{24}$ to $F_{28}$ which are all switched off thereby. About 1.11 milliseconds later a pulse appears at the terminal $T_{17}$ and is applied to switch off the flip-flop circuit $F_{30}$ whereby the binary counter is left in a condition ready to start the next count. About 2.22 milliseconds later a pulse appears at the terminal $T_{14}$ [Figures 5(c) and (d)] and the last described cycle of operations starts again.

An arrangement will now be described for distributing the voltages appearing at the terminals $T_{22}$ to $T_{26}$ channels and for converting these voltages in each channel into a series of pulses of the standard form for operating a teleprinter. In standard teleprinter practice each transmitted character is represented by a series of signals the series being of 166 milliseconds duration. Each series consists of a "start" signal lasting about 22 milliseconds during which no current is passed into the receiving teleprinter. This signal is followed by five further signals each lasting about 22 milliseconds during which a current of fixed magnitude, or zero current, is passed into the teleprinter dependent upon the character being transmitted. These five signals are followed by a "stop" signal lasting about 33 millseconds during which current of fixed magnitude is passed into the teleprinter. An example of such a series is shown in Figure 6 by a curve TPS. In Figure 6 the ordinate represents magnitude, the abscissa represents time, the intervals $t_1$ to $t_6$ are each of about 22 milliseconds and the interval $t_7$ is of 33 milliseconds. The signal commences at the beginning of the interval $t_1$ and ends at the end of the interval $t_7$. It will be seen that during the interval $t_1$ (start signal) and intervals $t_4$ and $t_6$ zero current is flowing, and that during the intervals $t_2$, $t_3$, $t_5$ and $t_7$, a current of amplitude $h$ is flowing. The signals $t_2$ to $t_6$ carry the information which determines the character to be printed by the receiving teleprinter. Those of signals $t_2$ to $t_6$ of zero amplitude are usually termed "space" signals and those of amplitude $h$ are usually termed "mark" signals. Including the combination having five space signals and that including five mark signals there are 32 possible combinations of mark and space signals.

Referring again to Figure 5(f), it is arranged that when any of the flip-flop circuits $F_{24}$ to $F_{28}$ are switched on and their associated gates $G_{10}$ to $G_{14}$ are open, their associated terminals $T_{22}$ to $T_{26}$ are at earth potential. It is also arranged that when the gates $G_{10}$ to $G_{14}$ are closed, and when any of the flip-flop circuits $F_{24}$ to $F_{28}$ are switched off and their associated gates are open, their associated terminals $T_{22}$ to $T_{26}$ are at negative potential. Whenever the gates $G_{10}$ to $G_{14}$ are opened the respective output terminals $T_{22}$ to $T_{26}$ assume either earth potential or a positive potential dependent upon whether the respective flip-flop circuits $F_{24}$ to $F_{28}$ are switched on or off. Including the condition in which all the terminals $T_{22}$ to $T_{26}$ are at earth potential, and that in which all the terminals $T_{22}$ to $T_{26}$ are at the positive potential, there are thirty-two possible combinations of the potentials at the terminals $T_{22}$ to $T_{26}$. These combinations are determined by the received audio oscillations as previously described, and the distributor about to be described serves to convert these combinations of potentials on the terminals $T_{22}$ to $T_{26}$ to signals having the previously described form (of which one example is shown in Figure 6), as well as to distribute the successive combinations of potentials appearing at the terminals $T_{22}$ to $T_{26}$ to 15 channels.

A part of the distributor is shown in Figure 5(*g*), and comprises a ring of conducting segments or contacts $C_1$ to $C_{15}$ which are insulated from one another. A slip ring $SL_1$ is disposed on one side of the segments $C_1$ to $C_{15}$ and a second slip ring $SL_2$ is disposed on the opposite side. The two slip rings $SL_1$ and $SL_2$ are arranged (in any suitable manner) to have potentials +100 volts and −100 volts respectively relatively to earth. Batteries $E_3$ and $E_4$ are shown for this purpose. Two brushes $BR_1$ and $BR_2$ are arranged to make connections between the slip ring $SL_1$ and the contacts $C_1$ to $C_{15}$ in turn as the brushes are rotated. A third brush $BR_3$ is arranged to make a connection between the slip ring $SL_2$ and the contacts $C_1$ to $C_{15}$ as this brush is rotated. The three brushes $BR_1$, $BR_2$ and $BR_3$ are arranged to be rotated in step by a shaft SH in the direction of the arrow whereby the brush $BR_3$ lags on the brushes $BR_1$ and $BR_2$. The brushes $BR_1$ and $BR_2$ are arranged to be in contact with two adjacent contacts at any instant, these brushes being shown in contact with contacts $C_1$ and $C_{15}$ respectively in the drawing. At the same instant the brush $BR_3$ is made to be in contact with the contact next preceding that in connection with the brush $BR_2$. In the drawing the brush $BR_3$ is shown to be in contact with the contact $C_{14}$.

The shaft SH is coupled to a 60 c./s. synchronous motor $M_2$ by any suitable gearing of 5:1 ratio shown in the drawing by a broken line $SH^1$. The shaft of the motor $M_2$ is arranged to rotate at 1,800 R. P. M. whereby the brushes $BR_1$, $BR_2$ and $BR_3$ make six complete revolutions every second, that is to say, approximately one every 166 milliseconds. In this way each of the brushes remains in contact with each of the contacts $C_1$ to $C_{15}$ in turn for a period of 11.11 milliseconds.

Alternating current for the motor $M_2$ is derived from the voltage appearing at the terminal $T_{18}$ which is that shown in Figure 5(*c*). This voltage is in the form of pulses occurring at a frequency of 360 pulses per second. These pulses are applied, as shown in Figure 5(*g*), to a frequency divider having a division ratio of 6:1 and comprising six flip-flop circuits arranged in the form of a counter CR having a rotational frequency of 60 c./s. Outputs are taken from flip-flop circuits Nos. 2 and 5 in the counter CR and applied to the input of a push-pull amplifier PPA whose output is applied to the motor $M_2$. The motor $M_2$ is synchronized, therefore, to the motor $M_1$ of Figure 4(*b*).

For the purpose of further description it is preferred to represent the contacts $C_1$ to $C_{15}$ of Figure 5(*g*) in extended fashion as shown in Figure 5(*h*).

Figure 5(*h*) shows valve apparatus for supplying suitable voltages to a teleprinter in No. 1 channel. Fifteen sets of valve apparatus as shown in Figure 5(*h*) are provided, the apparatus for channel No. 2 being shown in Figure 5(*j*) to be described later.

Referring to Figure 5(*h*) seven thyratrons $GT_1$ to $GT_7$ are provided. These are of the type having two control grids as shown. In order to strike thyratrons of this type it is necessary to apply positive potential to the anode and both grids. A triode $V_1$ is also provided for triggering the thyratrons $GT_1$ to $GT_7$. The cathode of the valve $V_1$ is connected to earth, the control grid through a resistor $P_6$ to a terminal $T_{27}$ and through a resistor $P_7$ to contact $C_{15}$ of the distributor. The terminal $T_{27}$ is arranged to have a potential of +100 volts and the anode of the valve $V_1$ is connected to this terminal through a resistor $P_8$. The inner grids of the thyratrons $GT_1$ to $GT_7$ are connected through resistors $P_9$ to $P_{15}$ respectively and the common terminal of all these resistors is connected through a resistor $P_{16}$ to the junction of two resistors $P_{17}$ and $P_{18}$ connected between a terminal $T_{28}$ and earth. The terminal $T_{28}$ is arranged to have a potential of −75 volts whereby the inner grids of the thyratrons $GT_1$ to $GT_7$ are normally negatively biased. The anode of the valve $V_1$ is coupled through a capacitor $CP_1$ to the common terminal of the resistors $P_9$ to $P_{15}$.

The outer grids of the thyratrons $GT_1$ to $GT_5$ are connected through resistors $P_{19}$ to $P_{23}$ to the five terminals $T_{22}$ to $T_{26}$ which are those shown in Figure 5(*f*). The outer grids of the thyratrons $GT_6$ and $GT_7$ are connected through resistors $P_{23}$ and $P_{24}$ respectively to a terminal $T_{29}$ which is arranged to have a positive potential whereby the outer grids of the two thyratrons $GT_6$ and $GT_7$ are normally positive. The cathodes of the thyratrons are connected together and through one winding of a differential relay $REL_1$ to earth. The anodes of the seven thyratrons $GT_1$ and $GT_7$ are connected through resistors $P_{25}$ to $P_{31}$ respectively, and the common terminal of these resistors is connected through the other winding of the differential relay $REL_1$ to the terminal $T_{27}$. The anodes of the thyratrons $GT_1$ to $GT_7$ are also connected through resistors $P_{32}$ to $P_{38}$ and rectifiers $R_6$ to $R_{12}$ respectively to contacts $C_3$, $C_5$, $C_7$, $C_9$, $C_{11}$, $C_{13}$ and $C_{14}$ respectively of the distributor. The relay $REL_1$ has a fixed contact $FC_1$ connected to the terminal $T_{27}$ at +100 volts, and a second fixed contact $FC_2$ connected to earth. The moving contact $MC_1$ of the relay $REL_1$ is connected to an output terminal $T_{30}$ for connection to a teleprinter input terminal.

In operation, as the brush $BR_3$ passes over the contact $C_{15}$ the brushes $BR_1$ and $BR_2$ pass over contacts $C_2$ and $C_1$ respectively. During this interval of 11.11 milliseconds a negative-going pulse of 100 volts is applied from the contact $C_{15}$ to the control grid of the triode $V_1$ causing the anode current of this valve to be cut off and a large positive-going pulse to be applied to the inner grids of the seven thyratrons $GT_1$ to $GT_7$. The thyratrons $GT_6$ to $GT_7$ have positive potential on their outer grids from the terminal $T_{29}$ and positive potential on their anodes through the resistors $P_{30}$ and $P_{31}$ respectively. These two thyratrons strike. It is arranged that the gates $G_{10}$ to $G_{14}$ Figure 5(*f*) are open for about 1.11 milliseconds and it will be remembered that the terminals $T_{22}$ to $T_{26}$ have potentials determined by a signal received in channel No. 1. The anodes of the thyratrons $GT_1$ to $GT_5$ have positive potential applied thereto through the resistors $P_{25}$ to $P_{29}$ respectively. Those of the thyratrons $GT_1$ to $GT_5$ whose outer grids are connected to those of terminals $T_{22}$ to $T_{26}$ which are at positive potential, strike, and the remainder stay non-conducting. The currents flowing in the two windings of the relay $RFL_1$ are equal and hence, throughout this interval of 11.11 milliseconds, the moving contact $MC_1$ is in contact with the earthed fixed contact $FC_2$ and hence a space signal is sent to the terminal $T_{30}$. The brushes move on and during the next five successive intervals each of about 22 milliseconds duration, the contacts $C_3$, $C_5$, $C_7$, $C_9$ and and $C_{11}$ are made 100 volts positive in turn by the brushes $BR_1$ and $BR_2$. These five contacts are connected through the rectifiers $R_6$ to $R_{10}$ respectively to the anodes of the five thyratrons $GT_1$ to $GT_5$. A positive-going pulse of 22 milliseconds duration is, therefore, applied to these anodes in turn. The cathode current of each of the thyratrons $GT_1$ to $GT_5$ which is struck is therefore increased whereby the relay $REL_1$ is operated causing a mark signal to be transmitted to the terminal $T_{30}$. The cathode current of each of the thyratrons $GT_1$ to $GT_5$ which is non-conducting remains unaltered whilst the positive pulse is applied to the anodes thereof, and hence a space signal is sent to the terminal $T_{30}$. In this way five mark and/or space signals each of about 22 milliseconds duration follow each other in succession in dependence upon the potentials applied to the terminals $T_{22}$ to $T_{26}$ during the interval when the brush $BR_3$ was on the contact $C_{15}$.

The brushes move on and $BR_1$ and $BR_2$ in passing over contacts $C_{13}$ and $C_{14}$ in succession cause a positive-going pulse of about 22 milliseconds duration to be applied to the anode of the thyratron $GT_6$ and a positive-going pulse of about 11.11 milliseconds duration to be applied to the anode of the thyratron $GT_7$. The sum of the cathode currents of $GT_6$ and $GT_7$ is, therefore, increased and the relay $REL_1$ is operated for a period of about 33 milliseconds, and hence a stop signal of that duration is applied to the terminal $T_{30}$.

Each of the positive-going pulses applied to the anodes of the thyratrons $GT_1$ to $GT_5$ is followed by a negative-going pulse from the brush $BR_3$ which extinguishes those of the thyratrons $GT_1$ to $GT_5$ which were struck. The brush $BR_3$ on reaching the contact $C_{13}$ causes the thyratron $GT_6$ to be extinguished and on reaching contact $C_{14}$ causes the thyratron $GT_7$ to be extinguished, and the cycle of operations is completed. During the final 11.11 milliseconds interval of the cycle no current flows in the relay $REL_1$ and hence a space signal is applied to the terminal $T_{30}$. This space signal in combination with the space signal occuring during the first interval of 11.11 milliseconds of the cycle of operations described constitute a teleprinter start signal.

It will be seen, therefore, that over each interval of 166 milliseconds (one complete revolution of the brushes) there is transmitted to the terminal $T_{30}$ a start signal of 22 milliseconds' duration followed by a combination of five mark and/or space signals in succession each of about 22 miliseconds duration, followed by a stop signal of about 33 milliseconds duration. The combination of mark and/or space signals represents a character to be printed by the channel No. 1 teleprinter and determined by the automatic sender $A_1$ in Figure 4. The cycle of operations is repeated at the rate of six cycles per second whereby the teleprinter in channel No. 1 prints the characters as received in channel No. 1 at the standard rate of six every second.

The apparatus for channels Nos. 2 to 15 is the same as that shown in Figure 5(*h*) with the exception that the connections are such that each cycle of operations in the successive channels commences 11.11 milliseconds after that in the preceding channel. For example, the cycle of operations in the apparatus for channel No. 2 commences 11.11 milliseconds after that described with reference to Figure 5(*h*). This is achieved by making the connections between the valves V and the thyratrons GT and the contacts $C_1$ to $C_{15}$ in a suitable manner. For example, referring to Figure 5(*j*) this shows the apparatus for channel No. 2. The function of the valve $V_2$ is the same as that of the valve $V_1$ in Figure 5(*h*). Similarly the functions of the thyratrons $GT_8$ to $GT_{14}$ are the same as those of the thyratrons $GT_1$ to $GT_7$ respectively in Figure 5(*h*). In the arrangement of Figure 5(*j*) it will be seen that the anodes of the thyratrons $GT_8$ to $GT_{14}$ are connected to contacts $C_4$, $C_6$, $C_8$, $C_{10}$ and $C_{12}$ instead of to contacts $C_3$, $C_5$, $C_7$, $C_9$ and $C_{11}$ as is the case in Figure 5(*h*). The control grid of the valve $V_2$ is connected to contact $C_1$ instead of to contact $C_{15}$ as is the case in Figure 5(*h*). In this way each cycle of operation of the arrangement shown in Figure 5(*j*) is made to commence 11.11 milliseconds after that of the arrangement of Figure 5(*h*).

Referring now to Figure 5(*k*), this shows in more detail the synchronising circuit SC of Figure 5(*c*).

In Figure 5(*k*) the tuning fork $TF_2$ and the flip-flop circuits $F_{10}$ and $F_{11}$ are those shown in Figure 5(*c*), the terminals $T_{13}$ and $T_{19}$ are those shown in Figure 5(*b*). The terminal $T_{19}$ is, of course, that also shown in Figure 5(*d*). The wave forms of voltages present in various parts of the circuit are shown adjacent those parts in the drawing. The 90 c./s. modulation of the oscillations appearing at the terminal $T_{13}$ is extracted by means of a demodulator DM and passed through a pulse forming circuit $PF_3$ of known kind to produce one positive-going pulse per cycle of the 90 c./s. oscillation. These positive-going pulses are applied through a switch $SW_4$ to a Kipp relay $K_3$ whose delay is made adjustable in known manner to a maximum value of about three milliseconds. The output pulses of the Kipp relay $K_3$ are applied to the input terminals of two gates $G_{15}$ and $G_{16}$. The voltage of square wave form appearing at the terminal $T_{19}$ is applied through a phase-splitter $PC_3$, which provides two output voltages in anti-phase which are applied to the control terminals of the gates $G_{15}$ and $G_{16}$ respectively. These two gates are opened alternately, therefore, for periods of 5.55 milliseconds each. Each pulse applied to the input terminals of the gates $G_{15}$ and $G_{16}$ from the Kipp relay $K_3$ passes through one or the other of the gates $G_{15}$ and $G_{16}$ (depending upon the retalive phases of the pulses from the Kipp relay $K_3$ and the two outputs respectively of the phase-splitter $PC_3$) but never passes through both.

The output of the tuning fork $TF_2$ is passed into two phase-shifters $PC_4$ and $PC_5$ which produce phase-shifts of +45° and −45° respectively. The oscillations at 1,800 c./s. are then passed from the two phase-shifters $PC_4$ and $PC_5$ to flip-flop circuits $F_{29}$ and $F_{30}$ respectively acting in known manner to produce one pulse for each half-cycle of the oscillation applied thereto. The outputs of the flip-flop circuits $F_{29}$ and $F_{30}$ consist, therefore, of two trains of pulses at 3,600 pulses per second displaced 90° relatively to one another.

The pulses from the flip-flop circuit $F_{29}$ are applied to the input terminal of a gate $G_{17}$. The pulses from the flip-flop circuit $F_{30}$ are applied through a buffer stage to one input terminal of a flip-flop circuit $F_{31}$ and serve to switch this flip-flop circuit on. When the flip-flop circuit $F_{31}$ is switched on a voltage is applied therefrom to the control terminal of the gate $G_{17}$ to open this gate. Pulses are passed, therefore, from the flip-flop circuit $F_{29}$ through the gate $G_{17}$, which is normally open, to the flip-flop circuit $F_{10}$.

The pulses from the flip-flop circuit $F_{30}$ are also applied to the input terminal of a gate $G_{18}$ which is normally closed. This gate is closed by the pulses from the flip-flop circuit $F_{29}$ by way of a buffer stage $B_{20}$ which is connected to one input terminal of a flip-flop circuit $F_{32}$ to switch this flip-flop circuit off. When the flip-flop circuit $F_{32}$ is switched off a voltage is applied therefrom to close the gate $G_{18}$.

The other input termnials of the flip-flop circuits $F_{31}$ and $F_{32}$ are connected, however, to the output terminals of the gates $G_{15}$ and $G_{16}$ respectively. Each time a pulse appears at the output of the Kipp relay $K_3$ either the flip-flop circuit $F_{31}$ is switched off, or the flip-flop circuit $F_{32}$ is switched on thereby, depending whether the gate $G_{15}$ or $G_{16}$ is open at the instant when the pulse appears at the output of the Kipp relay $K_3$. If the gate $G_{15}$ is open, the pulse passed thereby serves to close the gate $G_{17}$ to one pulse from the flip-flop circuit $F_{29}$. On the other hand if the gate $G_{16}$ is open then the gate $G_{18}$ is opened to pass one pulse from the flip-flop circuit $F_{30}$.

The number of pulses applied to the flip-flop circuit $F_{10}$ in each period of 11.11 milliseconds is, therefore, either 39 or 41 but never 40, which is the number of pulses supplied in 11.11 milliseconds by each of the flip-flop circuits $F_{29}$ and $F_{30}$. The frequency of the pulses applied to the flip-flop circuit $F_{10}$ determines the rate at which the counter DR of Figure 5(*c*) completes each cycle of ten operations and this in turn determines the instant at which each half-cycle of the oscillation appearing at the terminal $T_{19}$ commences.

It will be assumed that at a given instant a positive half-cycle of the oscillation appearing at the terminal $T_{19}$ is just commencing and a burst of oscillations is just commencing at the terminals $T_9$ and $T_{10}$ of Figure 5(*b*). It will be remembered that each positive half-cycle of the oscillation appearing at the terminal $T_{19}$ is required to start about 2.8 milliseconds after the commencement of a burst of oscillations at the terminals $T_9$ and $T_{10}$ of Figure 5(*b*) whereby the gate $G_9$ of Figure 5(*f*) opens for 5.55 milliseconds over only the middle portion of a received signal to facilitate accurate counting by the flip-flop circuits $F_{24}$ to $F_{28}$. The delay of the Kipp relay $K_3$ is set to provide an output pulse 2.8 milliseconds after the arrival of each burst of oscillations at the terminals $T_9$ and $T_{10}$. It is arranged that positive half-cycles of the oscillation appearing at the terminal $T_{19}$ open the gate $G_{15}$ and that negative half-cycles open the gate $G_{16}$. The pulse appearing at the output of the Kipp relay passes, therefore, in this example, through the gate $G_{15}$ causing the counter DR of Figure 5(*c*) to be slowed down whereby the phase of the oscillation at the terminal $T_{19}$ is retarded. This is repeated several times until the commencement of each positive half-cycle of the oscillation at the terminal $T_{19}$ substantially coincides with the instants of occurrence of the pulses at the output of the Kipp relay $K_3$. The system then hunts about, and close to, this condition, one or perhaps two pulses passing through gate $G_{15}$ to slow up the counter DR [Figure 5(*c*)] and then one or perhaps two pulses passing through the gate $G_{16}$ to speed up the counter DR. Thereafter irrespective of the fact that the instants of commencement of the bursts of oscillations at the terminals $T_9$ and $T_{10}$ may be delayed or advanced owing to ionospheric effects or other causes, the synchronising circuit ensures that these changes are followed as they occur whereby the centre portion of 5.55 milliseconds of each signal is the only portion which is used. Furthermore, as the synchronous motor $M_2$ in the distributor arrangement described with reference to Figures 5(*c*), (*h*) and (*j*) is supplied with power from the counter DR of Figure 5(*c*) the distributor also follows these changes.

No special provision is made for continuously controlling the synchronism of the 15 channels, that is to say, to ensure that signals received in channel No. 1 go to teleprinter No. 1 and so on. With such rigid control over phase as previously described, channel synchronism is automatically maintained under normal conditions. It is necessary merely to arrange that the channels are correctly set up in the first instance.

In order to set up the 15 channels it is arranged that initially in 14 of the channels the same signal is sent repeatedly, say bursts of oscillations at 4,590 c./s., and in the remaining channel, say No. 1, a signal of, say, 1,800 c./s. is transmitted repeatedly. This may conveniently be arranged by a simple switching circuit.

At the receiving end the receiver is disconnected from the terminals $T_9$ and $T_{10}$ [Figure 5(*b*)] by means of the switch $SW_2$ and a tone at 1,800 c./s. is switched to the transformer $N_2$. The output of the receiver is passed to a resonant circuit tuned to 1,800 c./s. The output of the resonant circuit is applied to the vertical deflecting plates of a cathode ray tube and a time base circuit is connected to the horizontal deflecting plates of the tube. The time base circuit is arranged to produce linear deflection of the beam at a frequency of, say, 6 c./s.

A pulse is derived from the distributor in any convenient manner each time the brush $BR_3$ makes contact with contact $C_{15}$ and this pulse is also applied to the vertical deflecting plates of the cathode ray tube. Two vertical pulses appear, therefore, in the trace on the screen of the tube. When these two pulses coincide channel synchronism is achieved. In order to bring this about the switch $SW_4$ [Figure 5(*k*)] is set in the opposite condition to that shown, and one of the outputs of the phase-splitter $PC_3$ is passed through a differentiating circuit $CP_2$, $P_{39}$ to produce short pulses. These pulses pass through the switch $SW_4$, through the Kipp relay $K_3$ to the gates $G_{15}$ and $G_{16}$.

The distributor is, therefore, speeded up or slowed down depending upon which of the outputs of the phase-splitter $PC_3$ is passed through the differentiating circuit $CP_2$, $P_{39}$. The switch $SW_4$ is held in this condition until the vertical pulses on the screen of the cathode ray tube coincide. The switch $SW_4$ (which may conveniently be spring loaded) is returned to the condition shown in the drawing. Normal working in the system can then be started.

As the transmitter and receiver employ precision tuning forks, $TF_1$ and $TF_2$ respectively, synchronism of the transmitter and receiver is maintained for a period up to ½ hour in the event of a breakdown.

It will be appreciated that the embodiment described is capable of transmitting about 6,000,000 characters every 24 hours.

Assuming accurate demodulation the accuracy with which the characters are reproduced is dependent upon the signal-to-noise ratio. The effect of noise is to produce phase jitter in the signals after limiting at the receiver. The band width required in the embodiment described is about 3 kc./s. and it can be shown that incorrect printing would result if the signal-to-noise ratio were less than about 10 decibels. By making the spacing of the transmitted oscillations say 180 c./s. instead of 90 c./s., the minimum acceptable signal-to-noise ratio may be about 7 decibels. On the other hand by making the spacing 45 c./s. the minimum acceptable signal-to-noise ratio would be about 13 decibels.

It will be seen, therefore, that for any given minimum signal-to-noise ratio a system of the appropriate band width for maximum efficiency can be designed.

For example if the signals instead of being transmitted by radio are transmitted by line where the signal-to-noise ratio is likely to be 40 decibels or more, the channel spacing need be no more than about 2 or 3 c./s.

Facilities may be provided whereby the receiver can be switched for use with different channel spacings. In the arrangement described, for example, the moving contacts of the switch $SW_3$ [Figure 5(*b*)] may be connected to the lower pair of fixed contacts of the switch whereby both outputs of the pulse forming circuit $PF_1$ are applied to the terminal $T_{11}$. In addition a further pulse forming circuit $PF_1'$ is brought into operation which supplies pulses to the terminal $T_{12}$, and it is arranged that the latter pulses occur between those appearing at the terminal $T_{11}$. In this way operation with 45 c./s. channel spacing may be effected.

An advantage of the present embodiment lies in the fact that if, for example, there is an unwanted steady carrier present with the wanted signals this carrier is demodulated against itself and thereby produces a frequency of 5,760 which is the frequency required to make the counter perform two complete revolutions and hence will not show in the reproduced characters, it being assumed that the demodulator is sufficiently linear to prevent demodulation products of other frequencies from being present except at relatively small amplitudes. It is for this reason that the balanced modulator $BM_2$ is used for demodulation purposes, because a balanced modulator can be made to be substantially linear over a substantial range of amplitudes in the applied voltages.

Furthermore any ionospheric changes such as those causing changes in transmission time will usually affect two successive signals substantially equally and hence will be balanced out in the demodulation process.

The embodiment described with reference to Figs. 4 to 6 may be modified for transmitting speech. For example the five-unit binary codes applied to the terminals $T_1$ to $T_5$ of Fig. 4(*c*) may be of high frequency, say at the rate of 8,000 per second, and derived by apparatus as used in pulse code modulation systems. For example the pulse codes may be derived as descrbed in the Bell System Technical Journal, January 1948, and converted into simultaneous codes by passing them into a delay line having appropriate taps connected to the terminals $T_1$ to $T_5$.

The generator of Fig. 4(*b*) would, of course have to be speeded up to provide output oscillations of higher frequency. For example, suitable frequencies would be 160 kc./s. to 450 kc./s.

At the receiver the frequencies of the local oscillations used would have to be increased. The tuning fork $TF_2$ would, in the example given using oscillations from 160 kc./s. to 450 kc./s., be replaced by an oscillator of 160 kc./s. and the frequency of the oscillator CCO would be correspondingly increased.

The distributor of Figs. 5(*g*), (*h*) and (*j*) would not be employed, and would be replaced by a suitable distributor such as, for example, that described in the Bell System Technical Journal January 1948.

I claim:

1. An electric signalling system comprising means for generating at least two signals for transmission in succession, a transmitter, means to apply said signals to said transmitter, said transmitter comprising means controlled by said signals to transmit a first burst of oscillations in response to the first of said signals and, in response to the second of said signals, to transmit a second burst of oscillations whose frequency differs from that of the oscillations in said first burst by an amount directly characteristic of and individual to said second signal, and a receiver to receive said bursts of oscillations, said receiver comprising means forming two transmission channels having a common input, means to apply the received bursts to the two channels, one of the channels including means for changing the frequency of oscillations passed therethrough by a fixed amount, and at least one of the two channels including a delay device to delay the output from said one channel relative to the output of the other channel by a period equal to the period between the commencement of the two bursts, an output circuit and means for applying the outputs of the two channels to the output circuit, said output circuit including means to derive from the outputs of said channels an output oscillation whose frequency is directly dependent upon the difference between the frequencies of the outputs of the two channels.

2. A telegraph transmitter, comprising means for generating at least two signals for transmission in succession, means to transmit oscillations, means to apply one of said signals to shift the frequency of said oscillations from a first value to a second value different from the first value by an amount characteristic of and individual to said one of the signals, and to apply the other of the two signals to shift the frequency of said oscillations from said second value to a third value different from the second value by an amount characteristic of and individual to the said other signal.

3. A telegraph receiver, comprising an input terminal for received oscillations, means forming two transmission channels having their inputs connected to said terminal, one of said channels including a frequency changing device, at least one of the channels including a delay device, an output circuit connected to receive the outputs from the two channels, said output circuit including means to derive from said channel outputs an output oscillation whose frequency is dependent upon the difference between the frequencies of oscillations applied to the output circuit from the two channels.

4. A carrier frequency shift telegraph transmission system, comprising a source of mark and space signals, a transmitter, means to apply said signals to said transmitter, said transmitter comprising means responsive to each mark signal to transmit a first oscillation and responsive to each space signal to transmit a second oscillation whose frequency differs from that of the first oscillation, and a receiver to receive said oscillations, said receiver including means forming two transmission channels having a common input, means to apply said oscillations to said two channels, one of said channels including a frequency changing device and at least one of the channels including a delay device, an output circuit and means to apply the output of the two channels to the output circuit, the output circuit comprising means to derive from the outputs of said channels an output oscillation whose frequency is dependent upon the difference between the frequencies of the oscillations appearing at the outputs of the two channels.

5. A teleprinter signal transmission system, comprising means to apply a succession of teleprinter signals to generate a regularly recurring succession of bursts of oscillations respectively, the frequency of each burst differing from that of the next preceding burst by an amount characteristic of and individual to the signal producing said burst, a receiver, means to transmit said bursts of oscillations to said receiver, said receiver comprising means forming two transmission channels having a common input, means to apply the received bursts of oscillations to said two channels, one of said channels including a frequency changer, and at least one of the channels including a delay device to provide an output from the last said channel delayed relatively to that from the other channel by a period equal to the recurrence period of said bursts of oscillations, an output circuit, and means to apply the outputs of said channels to the output circuit, said output circuit including means to derive from the outputs of said channels an output oscillation whose frequency is directly dependent upon the difference between the frequencies of the oscillations appearing at the output of the two channels.

6. A telegraph transmitter comprising means for generating two identical signals for transmission in succession, means to transmit oscillations, means to apply the first of said signals to shift the frequency of said oscillations from a first value to a second value different from the first value by a difference value characteristic of and individual to said first signal, and to apply the second signal to shift the frequency of said oscillations in the same sense from said second value to a third value differing from the second value by an amount equal to said difference value.

7. A method of signalling comprising the steps of generating a carrier wave, generating a first signal, applying said first signal during a predetermined time interval to shift the frequency of said wave from a first value to a second value differing from said first value by an amount which is characteristic of and individual to the said first signal, generating a second signal, and applying said second signal during a subsequent predetermined time interval to shift the frequency of the said wave from said second value to a third value different from said first value and which differs from said second value by an amount which is characteristic of and individual to the second signal.

References Cited in the file of this patent

UNITED STATES PATENTS

| | | |
|---|---|---|
| 2,266,401 | Reeves | Dec. 16, 1941 |
| 2,301,373 | Cox | Nov. 10, 1942 |
| 2,654,025 | Higgins | Sept. 29, 1953 |